United States Patent
Yerramalli et al.

(10) Patent No.: US 11,153,880 B2
(45) Date of Patent: Oct. 19, 2021

(54) POWER ALLOCATION ACROSS MULTIPLE CARRIERS USING SHARED AND DEDICATED RADIO FREQUENCY SPECTRUM

(71) Applicant: QUALCOMM Incorporated, San Diego, CA (US)

(72) Inventors: Srinivas Yerramalli, San Diego, CA (US); Wanshi Chen, San Diego, CA (US); Peter Gaal, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 15/609,815

(22) Filed: May 31, 2017

(65) Prior Publication Data
US 2018/0049206 A1 Feb. 15, 2018

Related U.S. Application Data

(60) Provisional application No. 62/372,696, filed on Aug. 9, 2016.

(51) Int. Cl.
*H04W 72/04* (2009.01)
*H04W 52/34* (2009.01)
(Continued)

(52) U.S. Cl.
CPC ....... *H04W 72/0473* (2013.01); *H04W 16/14* (2013.01); *H04W 52/346* (2013.01);
(Continued)

(58) Field of Classification Search
CPC ............. H04W 16/14; H04W 72/0413; H04W 72/0473; H04W 72/10; H04W 52/38; H04W 52/346; H04W 74/0816
See application file for complete search history.

(56) References Cited

U.S. PATENT DOCUMENTS 8,965,442 B2 2/2015 Chen et al.
9,113,491 B2 8/2015 Montojo et al.
(Continued)

FOREIGN PATENT DOCUMENTS

CN 102918896 A 2/2013
CN 104540210 A 4/2015
(Continued)

OTHER PUBLICATIONS

ISA/EP, International Search Report and Written Opinion of the International Searching Authority, Int'l Application No. PCT/US2017/035512, dated Jul. 28, 2017, European Patent Office, Rijswijk, NL, 10 pgs.
(Continued)

*Primary Examiner* — Redentor Pasia
(74) *Attorney, Agent, or Firm* — Holland & Hart LLP/Qualcomm

(57) ABSTRACT

Methods, systems, and devices for wireless communication are described that provide for power allocation across different carriers using shared and dedicated radio frequency spectrum for a power-limited UE. In cases where a power-limited UE is to transmit control information, power allocation across different carriers may be determined based on one or more of a number of parameters, such as a type of control channel for transmission of control information, an outcome of an LBT procedure for a carrier using shared radio frequency spectrum, a timing of the LBT procedure, one or more other concurrent transmissions, or any combination thereof.

36 Claims, 18 Drawing Sheets

(51) Int. Cl.
*H04W 52/38* (2009.01)
*H04W 16/14* (2009.01)
*H04W 72/10* (2009.01)
*H04W 74/08* (2009.01)
*H04W 52/36* (2009.01)
*H04W 52/32* (2009.01)

(52) U.S. Cl.
CPC ....... *H04W 52/38* (2013.01); *H04W 72/0413* (2013.01); *H04W 72/10* (2013.01); *H04W 74/0816* (2013.01); *H04W 52/325* (2013.01); *H04W 52/367* (2013.01)

(56) References Cited

U.S. PATENT DOCUMENTS

| | | | |
|---|---|---|---|
| 9,743,432 B2 | 8/2017 | Ji et al. | |
| 2013/0142129 A1 | 6/2013 | Rinne et al. | |
| 2013/0203458 A1 | 8/2013 | Charbit et al. | |
| 2013/0230010 A1* | 9/2013 | Kim | H04W 52/146 370/329 |
| 2014/0362780 A1* | 12/2014 | Malladi | H04W 16/14 370/329 |
| 2014/0369257 A1 | 12/2014 | Borromeo | |
| 2015/0085797 A1* | 3/2015 | Ji | H04J 13/10 370/329 |
| 2015/0092703 A1* | 4/2015 | Xu | H04L 5/003 370/329 |
| 2015/0296463 A1* | 10/2015 | Charbit | H04W 52/34 455/522 |
| 2015/0365152 A1* | 12/2015 | Frenne | G03G 15/0812 370/252 |
| 2016/0050690 A1 | 2/2016 | Yun et al. | |
| 2016/0100406 A1 | 4/2016 | Chen et al. | |
| 2016/0100420 A1* | 4/2016 | Chen | H04W 16/14 370/329 |
| 2016/0164644 A1 | 6/2016 | Charbit et al. | |
| 2016/0227519 A1* | 8/2016 | Nimbalker | H04W 72/042 |
| 2016/0227578 A1* | 8/2016 | Lee | H04W 74/0816 |
| 2016/0278048 A1* | 9/2016 | Nory | H04L 1/1887 |
| 2017/0195999 A1* | 7/2017 | Feng | H04W 76/27 |
| 2017/0318595 A1* | 11/2017 | Dinan | H04L 5/0053 |
| 2018/0242317 A1* | 8/2018 | Marinier | H04W 72/0446 |
| 2018/0288805 A1* | 10/2018 | Bhorkar | H04L 5/0048 |
| 2020/0128565 A1* | 4/2020 | Von Elbwart | H04L 5/001 |

FOREIGN PATENT DOCUMENTS

| | | |
|---|---|---|
| CN | 105144805 A | 12/2015 |
| GB | 2498988 A | 8/2013 |
| WO | WO-2011011636 | 1/2011 |
| WO | WO-2011140504 A1 | 11/2011 |
| WO | WO-2015042594 A2 | 3/2015 |
| WO | WO-2016053660 A1 | 4/2016 |

OTHER PUBLICATIONS

Taiwan Search Report—TW106118047—TIPO—dated Feb. 9, 2021.

* cited by examiner

POWER ALLOCATION ACROSS MULTIPLE CARRIERS USING SHARED AND DEDICATED RADIO FREQUENCY SPECTRUM

CROSS REFERENCES

The present Application for Patent claims priority to U.S. Provisional Patent Application No. 62/372,696 by Yerramalli, et al., entitled "Power Allocation Across Multiple Carriers Using Shared and Dedicated Radio Frequency Spectrum," filed Aug. 9, 2016, assigned to the assignee hereof.

BACKGROUND

The following relates generally to wireless communication, and more specifically to power allocation across multiple carriers using shared and dedicated radio frequency spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Some modes of communication may enable communication between a base station and a UE over a shared radio frequency spectrum band, or over different spectrums (e.g., a dedicated radio frequency spectrum band and a shared radio frequency spectrum band). With increasing data traffic in cellular networks that use a dedicated radio frequency spectrum band, offloading of at least some data traffic to a shared radio frequency spectrum band may provide a mobile network operator (or cellular operator) with opportunities for enhanced data transmission capacity. Use of a shared radio frequency spectrum band may also provide service in areas where access to a dedicated radio frequency spectrum band is unavailable. When using shared radio frequency spectrum, a transmitter may first perform a listen before talk (LBT) procedure (e.g., a clear channel assessment (CCA)) to confirm that another transmitter is not already using the shared radio frequency spectrum. If the LBT procedure passes, indicating that the shared radio frequency spectrum is available for transmission, the transmitter may then transmit using the shared radio frequency spectrum.

In some cases, a UE may transmit using multiple concurrent carriers, with one or more carriers transmitted using dedicated radio frequency spectrum, and one or more carriers transmitted using shared radio frequency spectrum. In some cases, a total uplink transmit power available at the UE may not support transmissions on each carrier at a full power for the carrier. A UE in such a situation may be referred to as a power-limited UE. Additionally, in some cases a UE may be scheduled to transmit higher-priority control information on one or more carriers.

SUMMARY

The described techniques relate to improved methods, systems, devices, or apparatuses that support power allocation across multiple carriers using shared and dedicated radio frequency spectrum. Generally, the described techniques provide for power allocation across different carriers using shared and dedicated radio frequency spectrum for a power-limited UE. In cases where a power-limited UE is to transmit control information, power allocation across different carriers may be determined based on one or more of a number of parameters, such as a type of control channel for transmission of control information, a type of control information to be transmitted, a timing for transmission of the control information, an outcome of an LBT procedure for a carrier using shared radio frequency spectrum, a timing of the LBT procedure, one or more other concurrent transmissions, or any combination thereof.

A method of wireless communication is described. The method may include identifying a first carrier and a second carrier that are scheduled for a transmission in a transmission time interval (TTI), the first carrier using a dedicated radio frequency spectrum band and the second carrier using a shared radio frequency spectrum band, performing a listen before talk (LBT) procedure to determine availability of the second carrier for transmissions during the TTI, and allocating a total transmission power for the TTI across the first carrier and the second carrier based at least in part on a type of control channel for transmission of control information during the TTI, a type of control information to be transmitted during the TTI, a timing for transmission of the control information, an outcome of the LBT procedure, a timing of the LBT procedure relative to the TTI, one or more other transmissions to be transmitted during the TTI, or any combination thereof.

An apparatus for wireless communication is described. The apparatus may include means for identifying a first carrier and a second carrier that are scheduled for a transmission in a transmission time interval (TTI), the first carrier using a dedicated radio frequency spectrum band and the second carrier using a shared radio frequency spectrum band, means for performing a listen before talk (LBT) procedure to determine availability of the second carrier for transmissions during the TTI, and means for allocating a total transmission power for the TTI across the first carrier and the second carrier based at least in part on a type of control channel for transmission of control information during the TTI, a type of control information to be transmitted during the TTI, a timing for transmission of the control information, an outcome of the LBT procedure, a timing of the LBT procedure relative to the TTI, one or more other transmissions to be transmitted during the TTI, or any combination thereof.

Another apparatus for wireless communication is described. The apparatus may include a processor, memory in electronic communication with the processor, and instructions stored in the memory. The instructions may be operable to cause the processor to identify a first carrier and a second carrier that are scheduled for a transmission in a transmission time interval (TTI), the first carrier using a dedicated radio frequency spectrum band and the second carrier using a shared radio frequency spectrum band, perform a listen before talk (LBT) procedure to determine availability of the second carrier for transmissions during the TTI, and allocate a total transmission power for the TTI across the first carrier and the second carrier based at least in part on a type of control channel for transmission of control information during the TTI, a type of control information to be transmitted during the TTI, a timing for transmission of the control information, an outcome of the LBT procedure, a timing of the LBT procedure relative to the TTI, one or more other transmissions to be transmitted during the TTI, or any combination thereof.

A non-transitory computer readable medium for wireless communication is described. The non-transitory computer-readable medium may include instructions operable to cause a processor to identify a first carrier and a second carrier that are scheduled for a transmission in a transmission time interval (TTI), the first carrier using a dedicated radio frequency spectrum band and the second carrier using a shared radio frequency spectrum band, perform a listen before talk (LBT) procedure to determine availability of the second carrier for transmissions during the TTI, and allocate a total transmission power for the TTI across the first carrier and the second carrier based at least in part on a type of control channel for transmission of control information during the TTI, a type of control information to be transmitted during the TTI, a timing for transmission of the control information, an outcome of the LBT procedure, a timing of the LBT procedure relative to the TTI, one or more other transmissions to be transmitted during the TTI, or any combination thereof.

Some examples of the method, apparatus, and non-transitory computer-readable medium described above may further include processes, features, means, or instructions for prioritizing the first carrier and second carrier for power allocation based at least in part on a payload of the control information. In some examples of the method, apparatus, and non-transitory computer-readable medium described above, the prioritizing may include determining that each of the first carrier and second carrier are to transmit portions of the control information during the TTI, and determining the payload of the portion of the control information for each of the first carrier and the second carrier. In some examples of the method, apparatus, and non-transitory computer-readable medium described above, block acknowledgment control information may be prioritized ahead of channel state information (CSI) control information or non-block acknowledgment control information. In some examples of the method, apparatus, and non-transitory computer-readable medium described above, the allocating further comprises dividing the total transmission power between the first carrier and the second carrier for the control information transmissions, and dropping transmission of at least a portion of non-control information scheduled to be transmitted in the TTI.

In some examples of the method, apparatus, and non-transitory computer-readable medium described above, the TTI comprises a plurality of subframes, the second carrier may be scheduled for transmissions in each of the plurality of subframes, and the first carrier may be scheduled for transmission in a second subframe that may be after a first subframe, and the allocating further comprises prioritizing the second carrier to provide a first portion of the total transmission power to the second carrier irrespective of the scheduled transmission on of the first carrier, and allocating a difference between the total transmission power and the first portion of the total transmission power to the first carrier.

In some examples of the method, apparatus, and non-transitory computer-readable medium described above, the TTI comprises a plurality of subframes, the second carrier may be scheduled for transmissions in each of the plurality of subframes, and the first carrier may be scheduled for transmission in a second subframe that may be after a first subframe, and wherein the allocating further comprises determining a first portion of the total transmission power to be allocated to the second carrier irrespective of the scheduled transmission of the first carrier, reducing the first portion of the total transmission power based at least in part on a parameter associated with a transmission using the second carrier, allocating the reduced first portion of the total transmission power to the second carrier for each of the plurality of subframes, and allocating a difference between the total transmission power and the reduced first portion of the total transmission power to the first carrier. In some examples of the method, apparatus, and non-transitory computer-readable medium described above, the parameter associated with the transmission using the second carrier comprises a modulation and coding scheme (MCS), a redundancy version identification (RV ID), a power loss (PL) measurement, or any combination thereof.

In some examples of the method, apparatus, and non-transitory computer-readable medium described above, the TTI comprises a plurality of subframes, the second carrier may be scheduled for transmissions in each of the plurality of subframes, and the first carrier may be scheduled for transmission in a second subframe that may be after a first subframe, and wherein the allocating further comprises determining whether the second carrier may be scheduled for transmission in a third subframe of the plurality of subframes after the second subframe, dropping the first carrier in the second subframe, and allocating the total transmission power to the second carrier.

In some examples of the method, apparatus, and non-transitory computer-readable medium described above, the TTI comprises a plurality of subframes, the second carrier may be scheduled for transmissions in each of the plurality of subframes, and the first carrier may be scheduled for transmission in a second subframe that may be after a first subframe, and wherein the allocating further comprises determining that control information and shared channel information may be scheduled to be transmitted on the first carrier during the second subframe, diverting a portion of the total transmission power to the first carrier, transmitting the control information using the first carrier, and dropping the shared channel information scheduled to be transmitted on the first carrier.

In some examples of the method, apparatus, and non-transitory computer-readable medium described above, the TTI comprises a plurality of subframes, the second carrier may be scheduled for transmissions in each of the plurality of subframes, and the first carrier may be scheduled for transmission in a second subframe that may be after a first subframe, and wherein the allocating further comprises determining that control information and shared channel information may be scheduled to be transmitted on the first carrier during the second subframe and that only shared channel information may be scheduled to be transmitted on the second carrier during the second subframe, diverting a first portion of the total transmission power to the first carrier, allocating a difference between the total transmission power and the first portion of the total transmission power to the second carrier, transmitting the control information and shared channel information using the first carrier, and transmitting shared channel information scheduled to be transmitted on the second carrier. In some examples of the method, apparatus, and non-transitory computer-readable medium described above, a ratio of the total transmission power to divert may be based at least in part on whether aperiodic channel state information (CSI) is to be transmitted using the second carrier.

In some examples of the method, apparatus, and non-transitory computer-readable medium described above, the TTI comprises a plurality of subframes and each of the first carrier and the second carrier may be scheduled for transmissions in a first subframe immediately following completion of the LBT procedure, and wherein the allocating further comprises pre-allocating, prior to performing the LBT procedure, a first portion of the total transmission power to the first carrier a difference between the total transmission power and the first portion of the total transmission power to the second carrier. In some examples of the method, apparatus, and non-transitory computer-readable medium described above, a ratio between the first portion and the total transmission power may be determined based at least in part on whether control channel information scheduled on one or more of the first carrier or second carrier, or whether channel state information (CSI) is to be transmitted using a physical uplink shared channel (PUSCH). In some examples of the method, apparatus, and non-transitory computer-readable medium described above, allocating the total transmission power for the TTI across the first carrier and the second carrier is further based on whether the first carrier is associated with a primary cell or a primary secondary cell.

Some examples of the method, apparatus, and non-transitory computer-readable medium described above may further include processes, features, means, or instructions for transmitting a first portion of the first subframe following the LBT procedure using the pre-allocated transmission powers, reallocating the total transmission power for the TTI across the first carrier and the second carrier based at least in part on the outcome of the LBT procedure, and transmitting a remaining portion of the first subframe using the reallocated transmission powers. Some examples of the method, apparatus, and non-transitory computer-readable medium described above may further include processes, features, means, or instructions for receiving signaling from a base station indicating that the total transmission power for the TTI can be reallocated. In some examples of the method, apparatus, and non-transitory computer-readable medium described above, the signaling may be included in received downlink control information (DCI) from the base station or in radio resource control (RRC) signaling from the base station. Some examples of the method, apparatus, and non-transitory computer-readable medium described above may further include processes, features, means, or instructions for signaling the reallocation to the base station by puncturing a shared channel transmission during the first portion of the first subframe following the LBT procedure.

In some examples of the method, apparatus, and non-transitory computer-readable medium described above, the TTI comprises a plurality of subframes and each of the first carrier and the second carrier may be scheduled for transmissions in a first subframe immediately and the LBT procedure may be completed during the first subframe, and wherein the allocating further comprises pre-allocating, prior to performing the LBT procedure, a first portion of the total transmission power to the first carrier and a difference between the total transmission power and the first portion of the total transmission power to the second carrier, transmitting a first portion of the first subframe on the first carrier during the LBT procedure using the pre-allocated transmission powers, reallocating the total transmission power for the TTI across the first carrier and the second carrier based at least in part on the outcome of the LBT procedure, and transmitting a remaining portion of the first subframe using the reallocated transmission powers. Some examples of the method, apparatus, and non-transitory computer-readable medium described above may further include processes, features, means, or instructions for puncturing the first carrier transmission during the LBT procedure.

A method of wireless communication is described. The method may include identifying a user equipment (UE) capable of transmitting using both a first carrier and a second carrier, the first carrier using a dedicated radio frequency spectrum band and the second carrier using a shared radio frequency spectrum band, allocating wireless resources of the first carrier and the second carrier to the UE for uplink transmissions during a transmission time interval (TTI), configuring the UE to allocate a total transmission power for uplink transmissions of during the TTI across the first carrier and the second carrier based at least in part on a type of control channel for transmission of control information during the TTI, a type of control information to be transmitted during the TTI, a timing for transmission of the control information, an outcome of the LBT procedure, a timing of the LBT procedure relative to the TTI, one or more other transmissions to be transmitted during the TTI, or any combination thereof, and receiving the uplink transmissions from the UE on at least one of first carrier and the second carrier.

An apparatus for wireless communication is described. The apparatus may include means for identifying a user equipment (UE) capable of transmitting using both a first carrier and a second carrier, the first carrier using a dedicated radio frequency spectrum band and the second carrier using a shared radio frequency spectrum band, means for allocating wireless resources of the first carrier and the second carrier to the UE for uplink transmissions during a transmission time interval (TTI), means for configuring the UE to allocate a total transmission power for uplink transmissions of during the TTI across the first carrier and the second carrier based at least in part on a type of control channel for transmission of control information during the TTI, a type of control information to be transmitted during the TTI, a timing for transmission of the control information, an outcome of the LBT procedure, a timing of the LBT procedure relative to the TTI, one or more other transmissions to be transmitted during the TTI, or any combination thereof, and means for receiving the uplink transmissions from the UE on at least one of first carrier and the second carrier.

Another apparatus for wireless communication is described. The apparatus may include a processor, memory in electronic communication with the processor, and instructions stored in the memory. The instructions may be operable to cause the processor to identify a user equipment (UE) capable of transmitting using both a first carrier and a second carrier, the first carrier using a dedicated radio frequency spectrum band and the second carrier using a shared radio frequency spectrum band, allocate wireless resources of the first carrier and the second carrier to the UE for uplink transmissions during a transmission time interval (TTI), configure the UE to allocate a total transmission power for uplink transmissions of during the TTI across the first carrier and the second carrier based at least in part on a type of control channel for transmission of control information during the TTI, a type of control information to be transmitted during the TTI, a timing for transmission of the control information, an outcome of the LBT procedure, a timing of the LBT procedure relative to the TTI, one or more other transmissions to be transmitted during the TTI, or any combination thereof, and receive the uplink transmissions from the UE on at least one of first carrier and the second carrier.

A non-transitory computer readable medium for wireless communication is described. The non-transitory computer-readable medium may include instructions operable to cause a processor to identify a user equipment (UE) capable of transmitting using both a first carrier and a second carrier, the first carrier using a dedicated radio frequency spectrum band and the second carrier using a shared radio frequency spectrum band, allocate wireless resources of the first carrier and the second carrier to the UE for uplink transmissions during a transmission time interval (TTI), configure the UE to allocate a total transmission power for uplink transmissions of during the TTI across the first carrier and the second carrier based at least in part on a type of control channel for transmission of control information during the TTI, a type of control information to be transmitted during the TTI, a timing for transmission of the control information, an outcome of the LBT procedure, a timing of the LBT procedure relative to the TTI, one or more other transmissions to be transmitted during the TTI, or any combination thereof, and receive the uplink transmissions from the UE on at least one of first carrier and the second carrier.

Some examples of the method, apparatus, and non-transitory computer-readable medium described above may further include processes, features, means, or instructions for detecting the total transmission power allocation in the received uplink transmissions. In some examples of the method, apparatus, and non-transitory computer-readable medium described above, the detecting comprises blindly estimating the total transmission power allocation in the received uplink transmissions. In some examples of the method, apparatus, and non-transitory computer-readable medium described above, the detecting comprises determining that an uplink transmission on the first carrier may have been punctured by the UE. Some examples of the method, apparatus, and non-transitory computer-readable medium described above may further include processes, features, means, or instructions for determining the total transmission power allocation in the received uplink transmissions based at least in part on the punctured uplink transmission.

In some examples of the method, apparatus, and non-transitory computer-readable medium described above, the configuring comprises indicating in downlink control information (DCI) whether the allocation of total transmission power may be enabled at the UE. In some examples of the method, apparatus, and non-transitory computer-readable medium described above, the configuring comprises indicating in radio resource control (RRC) signaling whether the allocation of total transmission power may be enabled at the UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

As indicated above, in some cases a UE may transmit using multiple concurrent carriers, with one or more carriers transmitted using dedicated radio frequency spectrum, and one or more carriers transmitted using shared radio frequency spectrum. Furthermore, the UE may be scheduled to transmit higher-priority control information on one or more carriers, and may be in a power-limited situation where a total available transmission power at the UE may not support transmissions on each carrier at a full power for the carrier. Allocation of total available uplink transmission power across the different carriers may thus be performed, with one or more of the carriers receiving a reduced power than would otherwise be allocated to the carrier in a non-power-limited scenario. Furthermore, in situations where higher-priority control information is to be transmitted using one or more carriers, it may be desirable to allocate additional power to such carriers in order to increase the likelihood of successful reception of the control information. Various aspects of the present disclosure provide techniques for power allocation across multiple carriers.

Such power allocation may be further complicated when different carriers scheduled for transmission use both dedicated and shared radio frequency spectrum, because whether the UE transmits on the shared radio frequency spectrum is a function of whether a listen before talk (LBT) procedure clears or not. For example, if the LBT procedure does not clear, the UE may not transmit using the shared radio frequency spectrum and thus have additional power available for one or more of the other carriers.

Various techniques are provided for power allocation across different carriers using shared and dedicated radio frequency spectrum. In cases where a power-limited UE is scheduled to transmit control information, power allocation across different carriers may be determined based on one or more of a number of parameters, such as a type of control channel for transmission of control information, a type of control information to be transmitted, a timing for transmission of the control information, an outcome of an LBT procedure for a carrier using shared radio frequency spectrum, a timing of the LBT procedure, one or more other concurrent transmissions, or any combination thereof.

Aspects of the disclosure are initially described in the context of a wireless communications system. Various examples of power allocation techniques based on LBT timing and control information transmissions are then provided. Aspects of the disclosure are further illustrated by and described with reference to apparatus diagrams, system diagrams, and flowcharts that relate to power allocation across multiple carriers using shared and dedicated radio frequency spectrum.

Figure 1:
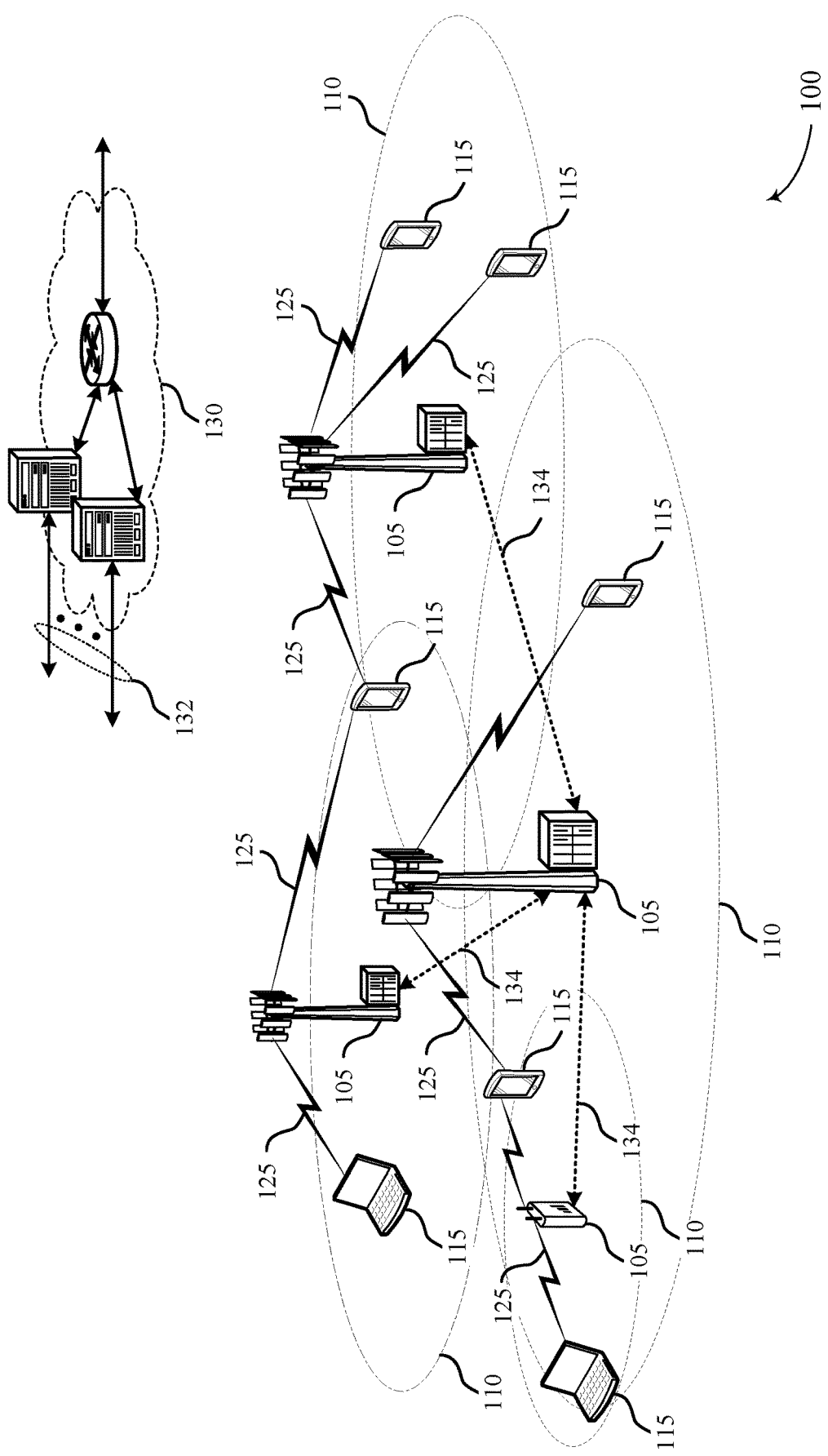
FIG. 1 illustrates an example of a system for wireless communication that supports power allocation across multiple carriers using shared and dedicated radio frequency spectrum in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network. UEs 115 and base stations 105 may support multiple concurrent transmissions using shared and dedicated radio frequency spectrum. Power allocation across different carriers using shared and dedicated radio frequency spectrum may be determined based on one or more of a number of parameters, such as a type of control channel for transmission, a type of control information to be transmitted, a timing for transmission of the control information, an outcome of an LBT procedure for a carrier using shared radio frequency spectrum, a timing of the LBT procedure, one or more other concurrent transmissions, or any combination thereof.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

The communication links 125 may support one or more services between devices of the wireless communication system 100. Services may include, for example, point-to-point (e.g., unicast) services between two devices (e.g., between a network device 105 and a user equipment (UE) 115, between a first UE 115 and a second UE 115, etc.), point-to-multipoint (e.g., broadcast or multicast) services between a device and a set of other devices (e.g., between a network device 105 and a set of UEs 115, between a UE 115 and a set of other UEs 115, etc.), or services forwarded by devices such as those services provided by way of a mesh network. Examples of services may include data services, data transfer services, data transfer services over transmission control protocol (TCP), data transfer services over user datagram protocol (UDP), voice services, voice-over-IP (VoIP) services, IP multimedia services, text messaging services, short message services (SMS), emergency broadcast services, emergency call services, public warning system services, internet services, multimedia broadcast and multicast services (MBMS), sensor data distribution services, vehicle-to-vehicle services, and/or the like, each of which may be considered as a type of service. Additionally or alternatively, types of services may include whether traffic associated with a service is latency sensitive (e.g., associated with a latency parameter, etc.) or "mission critical" (e.g., associated with an acceptable and/or threshold error rate, etc.), a quality of service (QoS) parameter associated with a service, a priority or priority level of data associated with a service, an acknowledgement mode (AM) of a service, and/or the like.

In some cases, wireless system 100 may utilize both licensed and unlicensed radio frequency spectrum bands.

For example, wireless system 100 may employ Long Term Evolution (LTE) License Assisted Access (LTE-LAA) or LTE Unlicensed (LTE U) radio access technology in an unlicensed band such as the 5 GHz Industrial, Scientific, and Medical (ISM) band. As indicated above, when operating in unlicensed radio frequency spectrum bands, wireless devices such as base stations 105 and UEs 115 may employ LBT procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD), or a combination of both. In some cases, component carriers may be associated with cells where a primary cell (PCell) may use dedicated radio frequency spectrum and a secondary cell (SCell) may use shared radio frequency spectrum.

As indicated above, a UE 115 may transmit various different types of control information. One type of control information includes channel condition information that a base station 105 may gather in order to efficiently configure and schedule channels for communications with the UE 115. This information may be sent from the UE 115 in the form of a channel state report. A channel state report may contain a rank indicator (RI) requesting a number of layers to be used for downlink (DL) transmissions (e.g., based on the antenna ports of the UE 115), a precoder matrix indicator (PMI) indicating a preference for which precoder matrix should be used (based on the number of layers), and a channel quality information (CQI) representing the highest modulation and coding scheme (MCS) that may be used. CQI may be calculated by a UE 115 after receiving predetermined pilot symbols such as cell specific reference signal (CRS) or channel state information—reference signals (CSI-RS). RI and PMI may be excluded if the UE 115 does not support spatial multiplexing (or is not in support spatial mode). The types of information included in the report determines a reporting type. Channel state reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best subbands, or configured reports in which the subbands reported are selected by the base station 105.

Another type of control information includes acknowledgment information that indicates successful or unsuccessful reception of transmissions at a UE 115. Such acknowledgment information may include, for example, hybrid automatic repeat request (HARQ) acknowledgment/negative-acknowledgment (ACK/NACK) information. Such ACK/NACK information may include information on successful reception of a particular transmission for a transmitted subframe, or may include block acknowledgment information that may include information on successful reception of a number of transmissions for multiple subframes. If a base station 105 receives a NACK for a transmission or a block NACK for a number of transmissions, or does not receive ACK/NACK information within a certain time period, the base station 105 may retransmit the associated transmissions.

As indicated above, in some cases a UE 115 may transmit using multiple component carriers (CCs) using dedicated radio frequency spectrum, shared radio frequency spectrum, or combinations thereof. Furthermore, the UE 115 may be scheduled to transmit higher-priority control information on one or more CCs, and may be in a power-limited situation where a total available transmission power at the UE 115 may not support transmissions on each CC at a full power for the CC. Allocation of total available uplink transmission power across the different CCs may thus be performed, with one or more of the CCs receiving a lower amount of power than would otherwise be allocated to the CC in a non-power-limited scenario. Furthermore, in situations where higher-priority control information is to be transmitted using one or more CCs, it may be desirable to allocate additional power to such CCs in order to increase the likelihood of successful reception of the control information. Various aspects of the present disclosure provide techniques for power allocation across multiple CCs.

Such power allocation may be further complicated when different CCs scheduled for transmission use both dedicated and shared radio frequency spectrum, because whether the UE transmits on the shared radio frequency spectrum is a function of whether a listen before talk (LBT) procedure clears or not. For example, if the LBT procedure does not clear, the UE may not transmit using the shared radio frequency spectrum and thus have additional power available for one or more of the other dedicated radio frequency spectrum CCs.

Various techniques are provided for power allocation across different CCs using shared and dedicated radio frequency spectrum. In cases where a power-limited UE is to transmit control information, power allocation across different CCs may be determined based on one or more of a number of parameters, such as a type of control channel for transmission of control information, a type of control information to be transmitted, a timing for transmission of the control information, an outcome of an LBT procedure for a CC using shared radio frequency spectrum, a timing of the LBT procedure, one or more other concurrent transmissions, or any combination thereof. In some examples, the first carrier using the dedicated radio frequency spectrum band is associated with a primary cell (PCell). Alternatively, in the case of dual- or multi-connectivity, the first carrier may be associated with a primary secondary cell (PSCell). The allocation of total transmission power between the first carrier and the second carrier may further be based on whether the first carrier is associated with a PCell or a PSCell. For example, a PCell may receive more power allocation than a PSCell.

Figure 2:
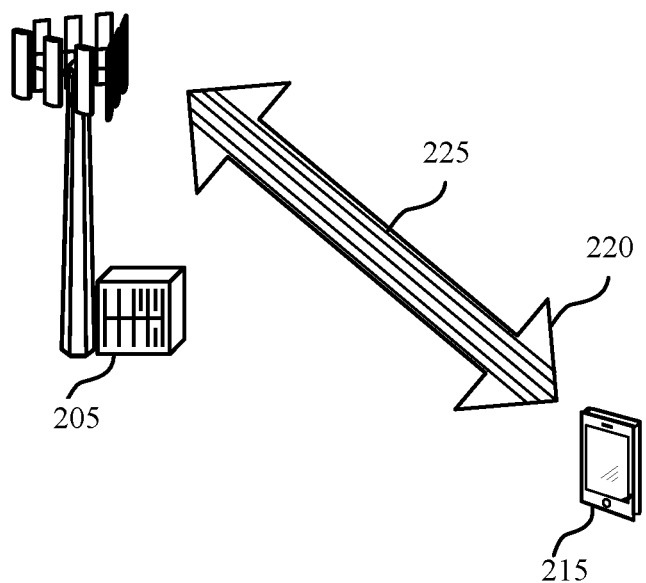
FIG. 2 illustrates an example of a wireless communications system that supports power allocation across multiple carriers using shared and dedicated radio frequency spectrum in accordance with aspects of the present disclosure.

FIG. 2 illustrates an example of a wireless communications system 200 for power allocation across multiple carriers using shared and dedicated radio frequency spectrum. The wireless communications system 200 may be an example of portions of the wireless communication system 100 described with reference to FIG. 1. Moreover, a base station 205 may be an example of aspects of one or more of the base stations 105 described with reference to FIG. 1, while a UE 215 may be an example of aspects of one or more of the UEs 115 described with reference to FIG. 1.

In the example of FIG. 2, UE 215 and base station 205 may communicate via communications link 220, which may include multiple CCs 225. The multiple CCs 225 may include multiple uplink CCs, multiple downlink CCs, or combinations thereof. The carrier aggregation mechanisms supported when using a shared radio frequency spectrum band may fall under a hybrid frequency division duplexing-time division duplexing (FDD-TDD) carrier aggregation or a TDD-TDD carrier aggregation with different symmetry across component carriers. In some examples, UE 215 may determine that multiple CCs, including one or more CCs using a dedicated radio frequency spectrum band and one or more CCs using a shared radio frequency spectrum band, are scheduled for transmission in a transmission time interval (TTI). The UE 215 may perform a LBT procedure to determine the availability of the shared radio frequency spectrum band for transmissions during the TTI.

The UE 215 may also determine that it is power-limited for the TTI, and that control information is to be transmitted during the TTI. The UE 215 may allocate a total transmission power for the TTI across the one or more CCs based at least in part on a type of control channel (e.g., physical uplink control channel (PUCCH), control information on PUSCH, physical hybrid-ARQ indicator channel (PHICH), etc.) for transmission of the control information, a type of control information (e.g., ACK/NACK information, CSI information, scheduling request (SR) information, buffer status report (BSR) information, other uplink control information (UCI), etc.) to be transmitted during the TTI, a timing for transmission of the control information, an outcome of the LBT procedure, a timing of the LBT procedure relative to the TTI, one or more other CC transmissions to be transmitted during the TTI, or any combination thereof.

The UE 215, in some cases, may be configured by the base station 205 to allocate uplink transmission power across CCs when power-limited. In some examples, the base station 205 may determine that the UE 215 is capable of transmitting using both the dedicated radio frequency spectrum and the shared radio frequency spectrum, may allocate wireless resources of one or more CCs to the UE for uplink transmissions during a TTI, and may configure the UE 215 to allocate a total transmission power for uplink transmissions during the TTI across the CCs based on one or more of the different parameters discussed above. The base station 205, in some examples, may detect the total transmission power allocation in the received uplink transmissions by, for example, blindly estimating the total transmission power allocation in received uplink transmissions, or determining that an uplink transmission on a CC using dedicated radio frequency spectrum has been punctured by the UE. The base station 205 may configure the UE 215 to perform power allocation across uplink CCs in downlink control information (DCI) or radio resource control (RRC) signaling that enables the allocation of total transmission power according to the parameters discussed herein, or that indicates that the UE 215 is to simply split available uplink power equally between carriers irrespective of any of the parameters discussed herein.

Figure 3:
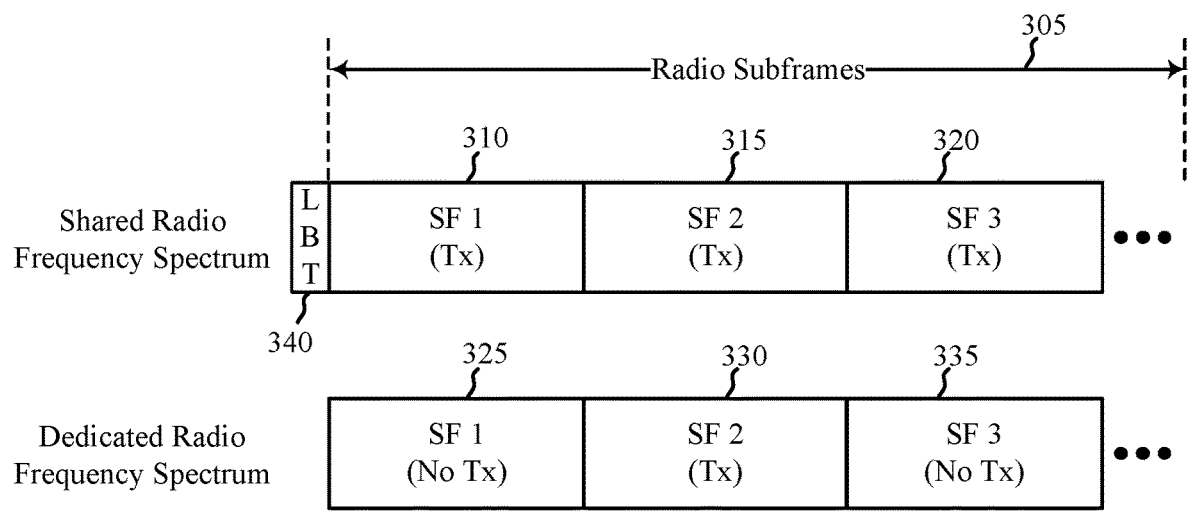
FIG. 3 illustrates an example of shared and dedicated radio frequency resources that support power allocation across multiple carriers using shared and dedicated radio frequency spectrum in accordance with aspects of the present disclosure.

FIG. 3 illustrates an example of a shared and dedicated radio frequency resources 300 for uplink power allocation across multiple carriers using shared and dedicated radio frequency spectrum. The shared and dedicated radio frequency resources 300 may be used for communications between UEs and base stations, as discussed with reference to FIGS. 1 and 2.

In the example of FIG. 3, a TTI may include a number of radio subframes 305 and multiple uplink CCs that may use shared radio frequency spectrum or dedicated radio frequency spectrum. In this example, a first CC may use shared radio frequency spectrum and may be scheduled to transmit in a first subframe 310, a second subframe 315, and a third subframe 320. A second CC may use dedicated radio frequency spectrum and may be scheduled to transmit only during second subframe 330 using the dedicated radio frequency spectrum, and may not be scheduled to transmit on first subframe 325 or third subframe 335 on the dedicated radio frequency spectrum. An LBT procedure 340 may be performed prior to transmission using the shared radio frequency spectrum. Thus, in this example the LBT procedure 340 is performed a relatively long time period before the UE needs to transmit the second subframe 330 on the second CC. In some examples, power allocation across the first CC and the second CC may be based at least in part on whether PUCCH or UCI piggybacking (e.g., piggybacking of PUCCH or UCI data with shared data) is used on the second CC.

In some examples the UE may prioritize transmission on the first CC and maintain constant power from the first subframe 310 to the second subframe 315, with remaining power, if any, allocated to the second CC on the dedicated radio frequency spectrum. For example, the UE may use this prioritization scheme when there is no PUCCH or UCI piggybacking on the second CC. Such a power allocation may allow the UE to transmit using the shared radio frequency spectrum with less likelihood of interference or channel loss of the first CC due to another transmitter on the shared radio frequency spectrum obtaining the medium due to lack of transmissions by the UE or low power transmissions by the UE that are not detected by an LBT procedure of the other transmitter.

In other examples, the UE may partially, but not fully, lower a power allocation to the first CC to reduce the likelihood of other transmitters occupying the shared radio frequency spectrum, while also allocating some power to the second CC. When referring to a reduction in power of a CC, reference is made to a reduction in power that would be otherwise be allocated to the CC in a non-power-limited transmission with no other concurrent uplink transmissions. The amount of the reduction in this example may be selected based on one or more parameters, such as a scheduled modulation and coding scheme (MCS), redundancy version identification (RV ID), power loss (PL) measurement, or other channel condition, or any combination thereof. In some examples, the UE may prioritize transmissions of the first CC and second CC based on one or more of these parameters and determine an amount of power reduction based on the prioritization.

In other examples, the UE determine whether or not to transmit on both the first CC and second CC. If the UE determines to transmit on both CCs, it may split power equally between the first CC and second CC. If the UE determines not to transmit on both CCs, the selection of which CC to use for the TTI may be based on other scheduled transmissions on the first CC during the TTI. For example, if the first CC is scheduled for transmissions in each of the radio subframes 305, the UE may drop transmissions on the second CC in order to retain the shared radio frequency spectrum band. However, if the first CC is not scheduled for transmission in a subsequent subframe, then the UE can select which of the first CC and second CC to drop (e.g., based on a payload of the data to be transmitted, etc.).

In some examples the UE may allocate all necessary power towards the second CC for PUCCH/PUSCH transmission, and allocate any remaining power to the first CC. For example, the UE may allocate all necessary power to the second CC in the event that PUCCH or UCI piggybacking is used on the second CC. In other examples, the UE may allocate a portion of the total available uplink power to the second CC, transmit a PUCCH transmission on the second CC, and drop a PUSCH transmission on the second CC in order to save some power and allocate the saved power to the first CC. Such a power allocation may enhance the likelihood of the UE keeping the shared radio frequency spectrum for the duration of the TTI. In other examples, the UE may allocate a portion of the total available uplink power to the second CC, transmit both PUCCH and PUSCH transmissions on the second CC, and transmit PUSCH transmissions on the first CC using the remaining power of the total available uplink power. In such examples, the ratio of power to allocate to the first CC and second CC may be a function of the payload of each CC. For example, the ratio of power to allocate to the first CC and the second CC may be based on whether CSI (e.g., aperiodic CSI) is carried on the first CC.

In some examples, control information may be scheduled for transmission on multiple CCs, such as both the first CC and the second CC of FIG. 3, during the TTI. In some examples, the UE may load balance power across CCs carrying control information and may drop transmissions on any other channels (e.g., PUSCH transmissions), fall back from PUSCH control channel transmissions to PUCCH transmissions, or use any remaining power for the other channels. In some cases, a priority for power allocation between CCs may be a function of the payload for control transmissions. For example, a block ACK payload to be transmitted using shared radio frequency spectrum may have a highest priority, followed by triggered CSI and non-block ACK/NACK feedback to be transmitted using shared radio frequency spectrum, followed by ACK/NACK feedback alone on either dedicated or shared radio frequency spectrum, followed by periodic CSI alone on either dedicated or shared radio frequency spectrum. In some cases, the base station may also indicate/configure the priority to be allocated to each transmission based on some pre-defined rules. For example, weighted payload size could be used to determine priority, in which weights may be determined per type of UCI, different weights applied for shared or dedicated radio frequency spectrum, or any combination thereof.

In some examples, multiple CCs using shared or dedicated radio frequency spectrum may have control information and power may be allocated based on control information payload. For example, four CCs using shared radio frequency spectrum may be scheduled to transmit ACK/NACK feedback, and one CC using dedicated radio frequency spectrum may be scheduled to transmit a triggered CSI transmission, and power may be allocated based on prioritization of triggered CSI ahead of ACK/NACK feedback. Prioritization of CCs for power allocation, in some examples, may also be based on whether the control information is PUCCH control information, UCI, or control information transmitted in PUSCH transmissions, with higher priority PUCCH control information prioritized ahead of other control information. The ratio of the total available uplink transmit power allocated to each carrier may be determined based on the prioritization of the payload on each CC. In some examples, ratios for power allocation may be pre-established, or may be dynamically determined based on the number/type of CCs and the payload of the CCs.

Figure 4:
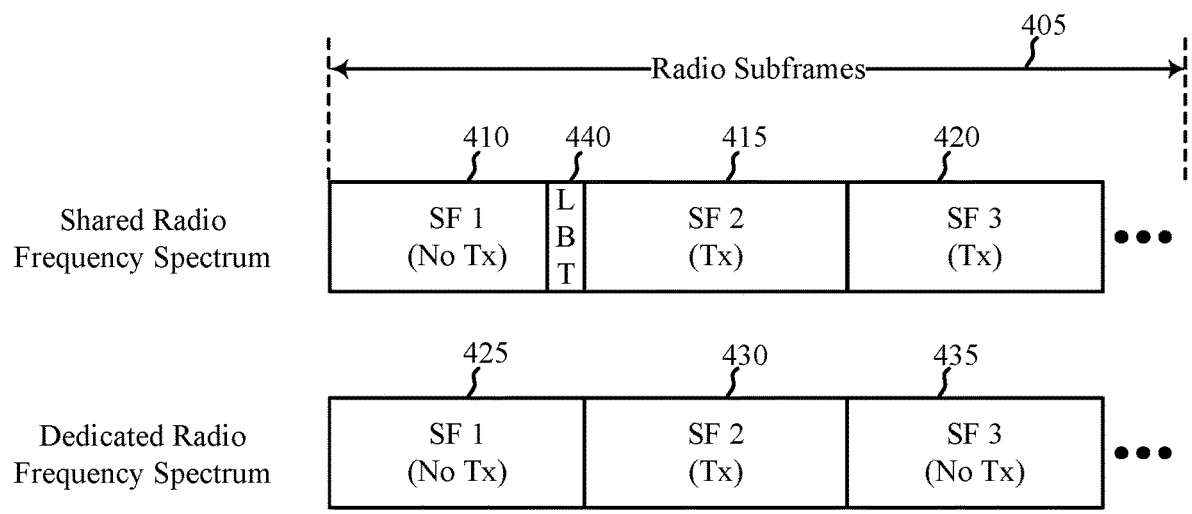
FIG. 4 illustrates an example of shared and dedicated radio frequency resources that support power allocation across multiple carriers using shared and dedicated radio frequency spectrum in accordance with aspects of the present disclosure.

FIG. 4 illustrates an example of a shared and dedicated radio frequency resources 400 for uplink power allocation across multiple carriers using shared and dedicated radio frequency spectrum. The shared and dedicated radio frequency resources 400 may be used for communications between UEs and base stations, as discussed with reference to FIGS. 1 and 2.

In the example of FIG. 4, a TTI may include a number of radio subframes 405 and multiple uplink CCs that may use shared radio frequency spectrum or dedicated radio frequency spectrum. In this example, a first CC may use shared radio frequency spectrum, may not transmit in first subframe 410, and may be scheduled to transmit in a second subframe 415 and a third subframe 420. A second CC may use dedicated radio frequency spectrum and may be scheduled to transmit only during second subframe 430 using the dedicated radio frequency spectrum, and may not be scheduled to transmit in first subframe 425 or third subframe 435 on the dedicated radio frequency spectrum. An LBT procedure 440 may be performed prior to transmission using the shared radio frequency spectrum in the second subframe 415. Thus, in this example the LBT procedure 440 is performed immediately prior to the scheduled transmission in the second subframe 430 on the second CC. In such a case, it may be desirable to allocate all available power to the second CC if the LBT procedure 440 fails, but the UE in some cases may not be capable of adjusting a power allocation in such a short time period. In other cases, a UE may be capable of such immediate power allocation, and may allocate power between the first CC and second CC when the LBT procedure 440 passes, and may allocate power to only the second CC when the LBT procedure 440 fails.

In examples where a UE is capable to allocate power between the first CC and second CC when the LBT procedure 440 passes, the UE may indicate the capability to the base station, and the base station may configure the UE to perform the power allocation. Such capability may be indicated, for example, in RRC signaling, and the base station may configure the UE for power allocation in RRC signaling or in DCI signaling.

In examples where a UE is not capable of allocating power based on the outcome of the LBT procedure 440 immediately following the LBT procedure, in some examples the total available uplink transmit power may be pre-allocated between the different carriers. In the event that the LBT procedure fails, such a UE may simply not use the power that was pre-allocated to the first CC. The amount of the total available uplink transmit power allocated to each CC may be a function of whether PUCCH is present, CSI is piggybacked on PUSCH, any other of the parameters for allocation and prioritization as discussed herein, or any combination thereof. In some examples, a UE may initially use a pre-allocated power based on the assumption that the LBT procedure 440 will pass, and scale the uplink power allocated to the second CC during the second subframe 430 (e.g., after one or two ODFM symbols of the second subframe 430) if the LBT procedure 440 does not pass. In examples that use quadrature phase shift keying (QPSK) or binary phase shift keying (BPSK) for the uplink transmissions, the base station may not need to be aware of the change in power allocation, as demodulation of QPSK/BPSK transmission is not impacted by the power allocation. In cases where higher order modulation is used (e.g., 16 QAM, 32QAM, 64 QAM, etc.), the base station may determine if the power allocation was modified during the second subframe 430. Such a determination may be made, for example, by providing a fixed scaling ratio for such transmissions and having the base station blindly estimate whether power scaling is used. In other examples, the base station may indicate in DCI or RRC signaling whether power scaling can be used. In other examples, the UE may indicate to the base station that power scaling will be used by puncturing a PUSCH transmission (e.g., puncturing two or three resource elements (REs) in a PUSCH transmission) and embedding an indication to indicate scaling.

Figure 5:
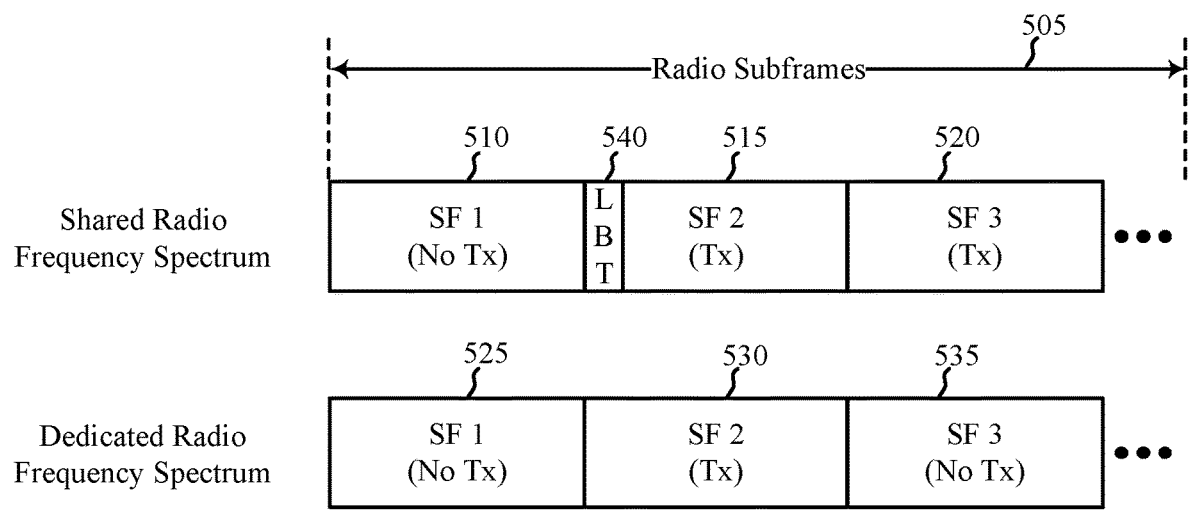
FIG. 5 illustrates an example of shared and dedicated radio frequency resources that support power allocation across multiple carriers using shared and dedicated radio frequency spectrum in accordance with aspects of the present disclosure.

FIG. 5 illustrates an example of a shared and dedicated radio frequency resources 500 for uplink power allocation across multiple carriers using shared and dedicated radio frequency spectrum. The shared and dedicated radio frequency resources 500 may be used for communications between UEs and base stations, as discussed with reference to FIGS. 1 and 2.

In the example of FIG. 5, a TTI may include a number of radio subframes 505 and multiple uplink CCs that may use shared radio frequency spectrum or dedicated radio frequency spectrum. In this example, a first CC may use shared radio frequency spectrum, may not be scheduled to transmit in first subframe 510, and may be scheduled to transmit in a second subframe 515 and a third subframe 520. A second CC may use dedicated radio frequency spectrum and may be scheduled to transmit only during second subframe 530 using the dedicated radio frequency spectrum, and may not be scheduled to transmit in first subframe 525 or third subframe 535 on the dedicated radio frequency spectrum. An LBT procedure 540 may be performed after the second subframe 515 boundary and prior to transmission using the shared radio frequency spectrum in the second subframe 515. In such a case, as discussed above with reference to FIG. 4, it may be desirable to allocate all available power to the second CC if the LBT procedure 540 fails, but the UE in some cases may not be capable of adjusting a power allocation in such a short time period. In other cases, a UE may be capable of such immediate power allocation, and may allocate power between the first CC and second CC when the LBT procedure 540 passes, and may allocate power to only the second CC when the LBT procedure 540 fails.

In some examples, a fixed power split between the first CC and second CC may be used irrespective of a result of the LBT procedure 540. In other examples, power scaling as discussed above with respect to FIG. 4 may be used starting from, for example, a second or third OFDM symbol of the second subframe. In some examples, the UE may puncture a transmission of the second CC to match the puncturing in the first CC associated with the LBT procedure 540, and use the result of the LBT procedure 540 for power scaling as discussed with respect to FIG. 4.

Figure 6:
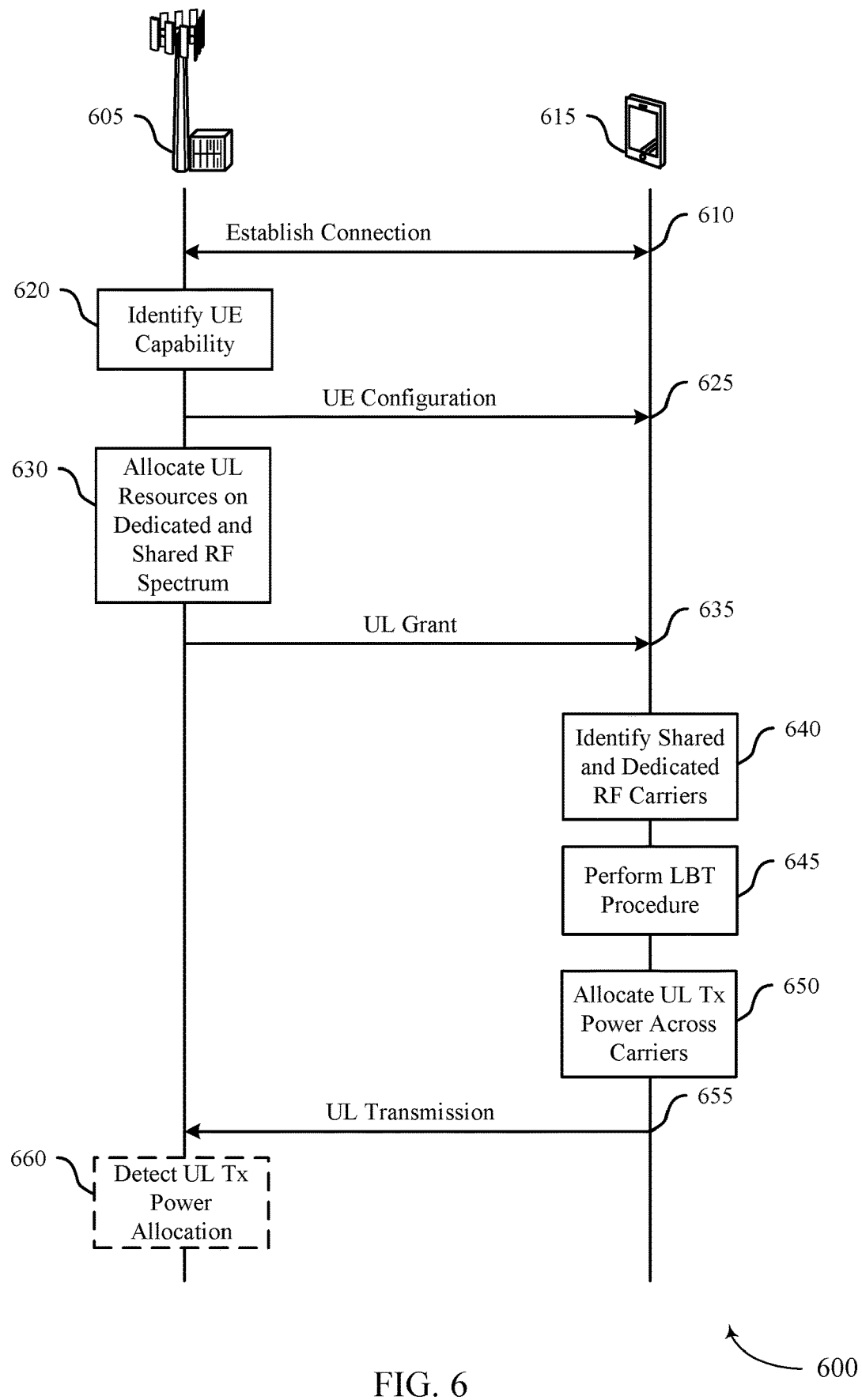
FIG. 6 illustrates an example of a process flow that supports power allocation across multiple carriers using shared and dedicated radio frequency spectrum in accordance with aspects of the present disclosure.

FIG. 6 illustrates an example of a process flow 600 for power allocation across multiple carriers using shared and dedicated radio frequency spectrum. The steps of process flow 600 may be performed by UE 615 and base station 605, which may be examples of a UE and a base station as described above with reference to FIGS. 1 and 2.

The base station 605 and UE 615 may perform a connection establishment procedure 610 to establish an RRC connection. In some examples, various configurations of parameters may be utilized as part of the connection establishment procedure 610, such as enabling power allocation techniques between CCs based on various parameters, an indication of a capability of UE 615 to perform power allocation and re-allocation, configuring different priorities of control information or control channels for power allocation, configuring different priorities for dedicated versus shared radio frequency spectrum CCs, and combinations thereof.

At block 620, the base station 605 may identify a capability of the UE 615 to perform power allocation according to the various techniques described herein. Such identification may be determined based on signaling in the connection establishment procedure 610, or based on other information associated with the UE 615 (e.g., a class of UE, or one or more other UE configurations that indicates capability for power allocation). In some cases, the base station 105 may transmit a request for UE capability, and may determine UE 615 capability based on a response to the request. The base station 605 may transmit a UE configuration 625 to the UE 615, which may indicate one or more configurations for UE power allocation. For example, UE configuration 625 may indicate that the UE 615 is to allocate power for multiple uplink CCs based on an established prioritization of combinations of channels and payload as discussed above. In some examples, the UE configuration 625 may be transmitted to the UE 615 as part of the connection establishment procedure 610.

At block 630, the base station 605 may allocate uplink resources to the UE 615 in both shared and dedicated radio frequency spectrum. Such an allocation may be determined based on, for example, a scheduling request (SR) or buffer status report (BSR) received from the UE 615. Uplink resources may be allocated in multiple CCs using shared radio frequency spectrum, dedicated radio frequency spectrum, or both. The base station 605 may transmit uplink grant 635 to the UE 615, which may be received at the UE 615 and used to determine uplink resources for an uplink transmission.

At block 640, the UE 615 may identify shared and dedicated radio frequency spectrum carriers for uplink transmissions during a TTI. The identification may be based on the uplink grant 635, and the allocated uplink resources provided to the UE 615. At block 645, the UE 615 may perform a LBT procedure to determine the availability of one or more CCs that use shared radio frequency spectrum.

At block 650, the UE 615 may allocate uplink transmission power across the uplink carriers based on the outcome of the LBT procedure, and one or more other parameters as discussed herein. Such a power allocation may be made prior to transmissions, or during uplink transmissions in some examples. The UE 615 may transmit uplink transmissions 655 based on the uplink power allocation for the CCs used for the uplink transmissions 655.

At optional block 660, the base station 605 may determine the uplink power transmission allocation. As indicated above, in the event of BPSK or QPSK transmissions, the base station 605 may not determine power allocation for uplink transmissions in all cases, but may make such a determination if higher order modulation is used. The determination of the uplink power allocation may be made, in some examples, by blindly detecting power allocations for uplink transmissions. The base station 605 may then demodulate and decode the uplink transmissions.

Figure 7:
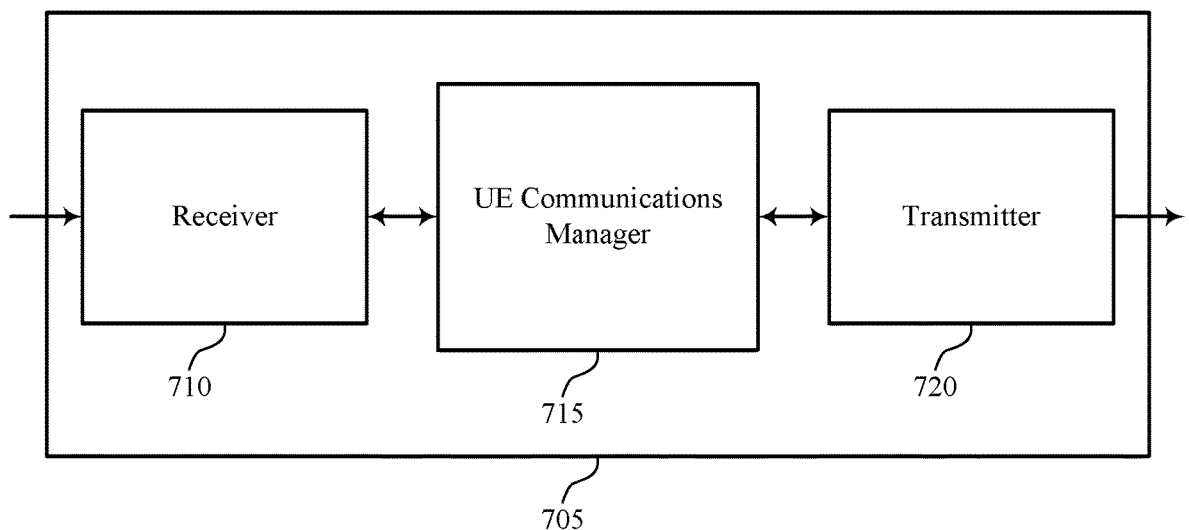
FIGS. 7 through 9 show block diagrams of a device that supports power allocation across multiple carriers using shared and dedicated radio frequency spectrum in accordance with aspects of the present disclosure.

FIG. 7 shows a block diagram 700 of a wireless device 705 that supports power allocation across multiple carriers using shared and dedicated radio frequency spectrum in accordance with various aspects of the present disclosure. Wireless device 705 may be an example of aspects of a user equipment (UE) 115, 215, or 615 as described with reference to FIGS. 1, 2, and 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to power allocation across multiple carriers using shared and dedicated radio frequency spectrum, etc.). Information may be passed on to other components of the device. The receiver 710 may be an example of aspects of the transceiver 1035 described with reference to FIG. 10.

UE communications manager 715 may be an example of aspects of the UE communications manager 1015 described with reference to FIG. 10. UE communications manager 715 may identify a first carrier and a second carrier that are scheduled for a transmission in a transmission time interval (TTI), the first carrier using a dedicated radio frequency spectrum band and the second carrier using a shared radio frequency spectrum band, perform a listen before talk (LBT) procedure to determine availability of the second carrier for transmissions during the TTI, and allocate a total transmission power for the TTI across the first carrier and the second carrier based on a type of control channel for transmission of control information during the TTI, a type of control information to be transmitted during the TTI, a timing for transmission of the control information, an outcome of the LBT procedure, a timing of the LBT procedure relative to the TTI, one or more other transmissions to be transmitted during the TTI, or any combination thereof.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Figure 8:
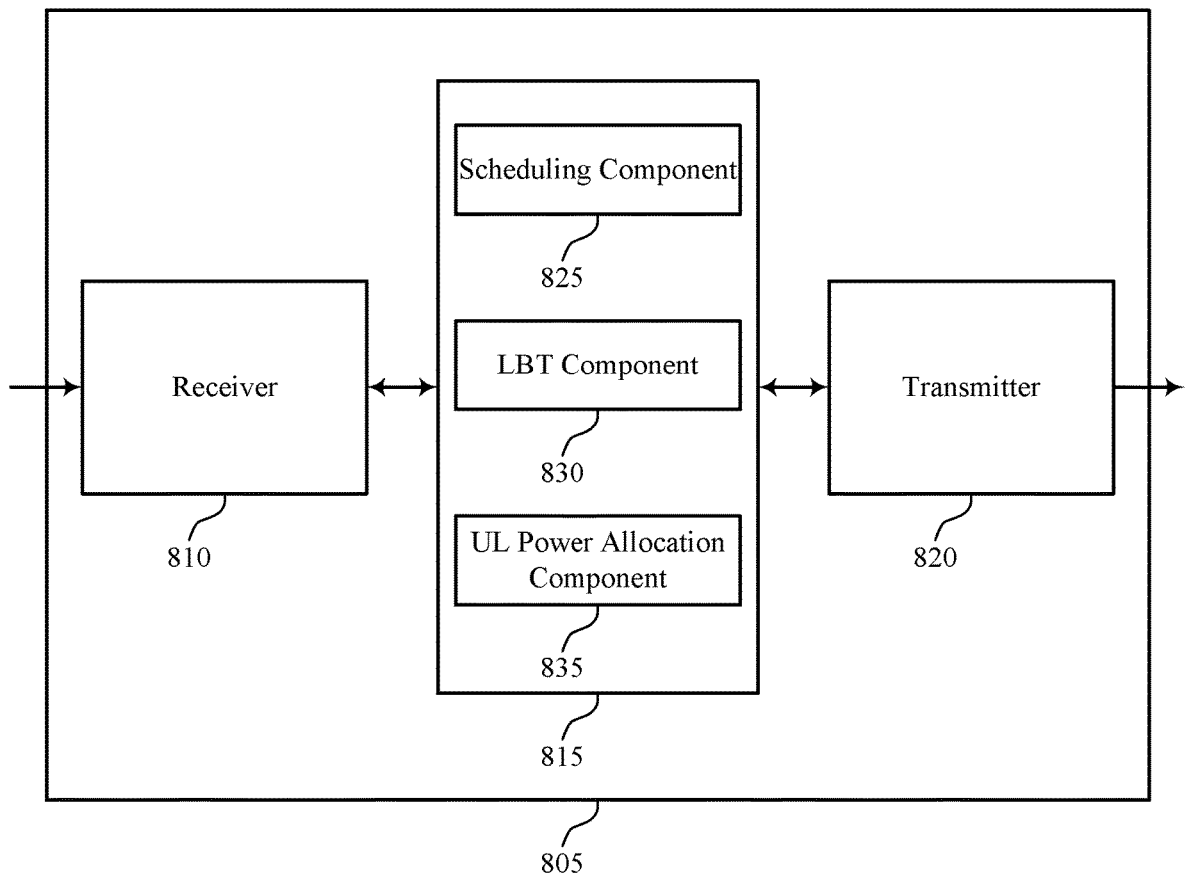

FIG. 8 shows a block diagram 800 of a wireless device 805 that supports power allocation across multiple carriers using shared and dedicated radio frequency spectrum in accordance with various aspects of the present disclosure. Wireless device 805 may be an example of aspects of a wireless device 705 or a UE as described with reference to FIGS. 1, 2, 6, and 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to power allocation across multiple carriers using shared and dedicated radio frequency spectrum, etc.). Information may be passed on to other components of the device. The receiver 810 may be an example of aspects of the transceiver 1035 described with reference to FIG. 10.

UE communications manager 815 may be an example of aspects of the UE communications manager 1015 described with reference to FIG. 10. UE communications manager 815 may also include scheduling component 825, LBT component 830, and uplink (UL) power allocation component 835.

Scheduling component 825 may identify a first carrier and a second carrier that are scheduled for a transmission in a TTI, the first carrier using a dedicated radio frequency spectrum band and the second carrier using a shared radio frequency spectrum band. In some cases, the TTI includes a set of subframes, the second carrier is scheduled for transmissions in a first subframe and a second subframe that is after the first subframe, and the first carrier is scheduled for transmission in the second subframe, and power may be allocated or a carrier dropped based on whether the second carrier is scheduled for transmission in a third subframe of the set of subframes after the second subframe. In some cases, power may be allocated based on determining that control information and shared channel information is scheduled to be transmitted on the first carrier during the second subframe. In some cases, power may be allocated based on determining that control information and shared channel information is scheduled to be transmitted on the first carrier during the second subframe and that only shared channel information is scheduled to be transmitted on the second carrier during the second subframe.

LBT component 830 may perform a listen before talk (LBT) procedure to determine availability of the second carrier for transmissions during the TTI. Such an LBT procedure may include, for example, a clear channel assessment (CCA).

UL power allocation component 835 may allocate a total transmission power for the TTI across the first carrier and the second carrier based on a type of control channel for transmission of control information during the TTI, a type of control information to be transmitted during the TTI, a timing for transmission of the control information, an outcome of the LBT procedure, a timing of the LBT procedure relative to the TTI, one or more other transmissions to be transmitted during the TTI, or any combination thereof. In some examples, the UL power allocation component 835 may allocate a difference between the total transmission power and the first portion of the total transmission power to the first carrier. In some cases, the UL power allocation component 835 may reduce a first portion of the total transmission power based on a parameter associated with a transmission using the second carrier, allocate the reduced first portion of the total transmission power to the second carrier for each of the set of subframes, and allocate a difference between the total transmission power and the reduced first portion of the total transmission power to the first carrier. In some examples, a first portion of the first subframe may be transmitted on the first carrier during the LBT procedure using pre-allocated transmission powers, and the total transmission power for the TTI may be reallocated across the first carrier and the second carrier based on the outcome of the LBT procedure. In some cases, a ratio between the first portion and the total transmission power is determined based on whether control channel information scheduled on one or more of the first carrier or second carrier, or whether channel state information (CSI) is to be transmitted using a physical uplink shared channel (PUSCH). In some cases, the TTI includes a set of subframes and each of the first carrier and the second carrier are scheduled for transmissions in a first subframe and the LBT procedure is completed during the first subframe, and where the allocating further includes pre-allocating, prior to performing the LBT procedure, a first portion of the total transmission power to the first carrier and a difference between the total transmission power and the first portion of the total transmission power to the second carrier. In some cases, a ratio of the total transmission power to divert is based on whether CSI (e.g., aperiodic CSI) is to be transmitted using the second carrier. In some cases, the allocating further includes dividing the total transmission power between the first carrier and the second carrier for the control information transmissions.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
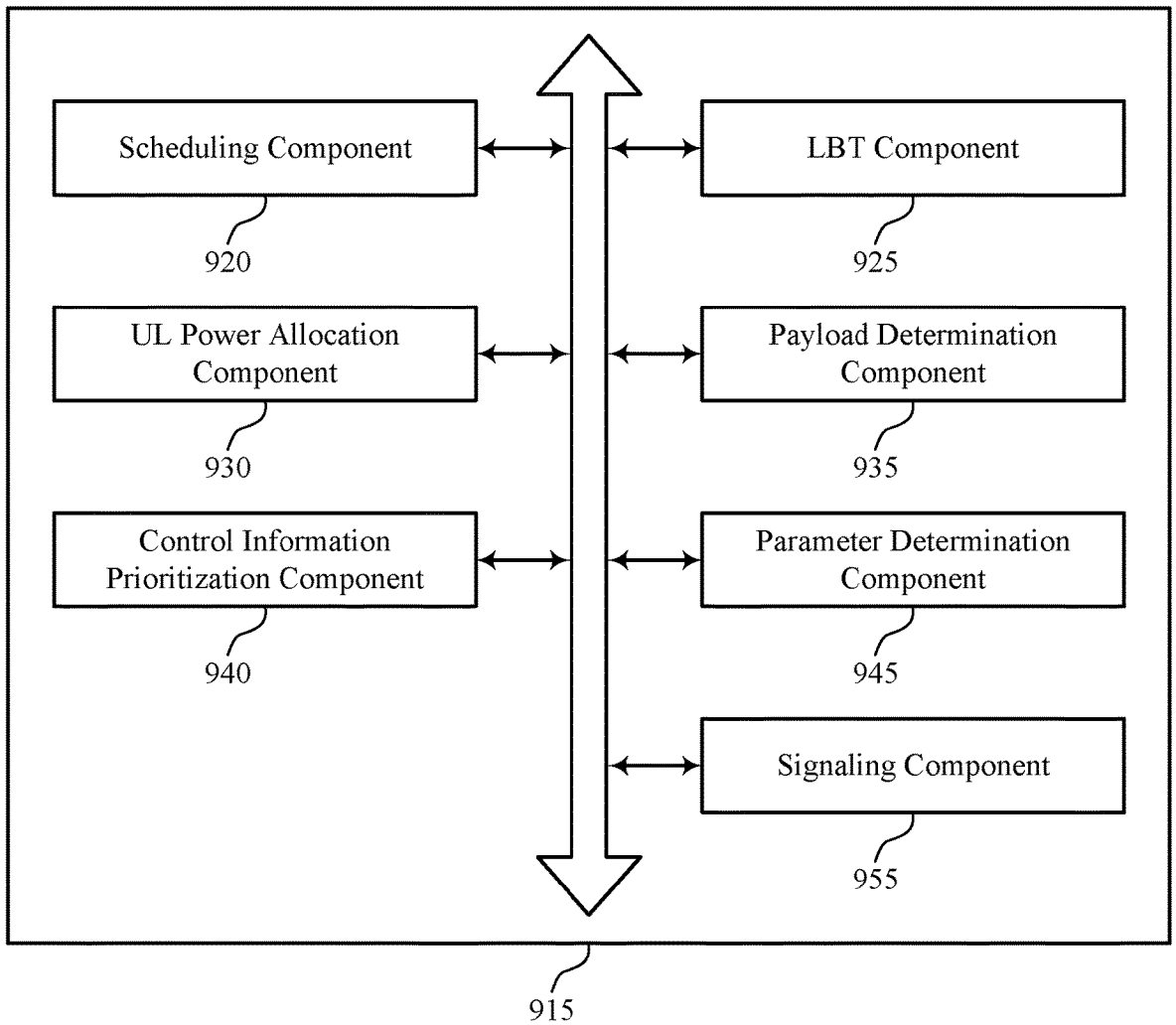

FIG. 9 shows a block diagram 900 of a UE communications manager 915 that supports power allocation across multiple carriers using shared and dedicated radio frequency spectrum in accordance with various aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include scheduling component 920, LBT component 925, UL power allocation component 930, payload determination component 935, control information prioritization component 940, parameter determination component 945, and signaling component 955. Each of these modules may communicate, directly or indirectly, with one another (e.g., via one or more buses).

Scheduling component 920 may identify a first carrier and a second carrier that are scheduled for a transmission in a TTI, the first carrier using a dedicated radio frequency spectrum band and the second carrier using a shared radio frequency spectrum band. In some cases, the TTI includes a set of subframes, the second carrier is scheduled for transmissions in a first subframe and a second subframe that is after the first subframe, and the first carrier is scheduled for transmission in the second subframe, and where the allocating further includes determining whether the second carrier is scheduled for transmission in a third subframe of the set of subframes after the second subframe. In some cases, allocating uplink transmission power further includes determining that control information and shared channel information is scheduled to be transmitted on the first carrier during the second subframe.

LBT component 925 may perform a listen before talk (LBT) procedure to determine availability of the second carrier for transmissions during the TTI. UL power allocation component 930 may allocate a total transmission power for the TTI across the first carrier and the second carrier based on a type of control channel for transmission of control information during the TTI, a type of control information to be transmitted during the TTI, a timing for transmission of the control information, an outcome of the LBT procedure, a timing of the LBT procedure relative to the TTI, one or more other transmissions to be transmitted during the TTI, or any combination thereof, as discussed above.

Payload determination component 935 may prioritize the first carrier and second carrier for power allocation based on a payload of the control information and determine the payload of the portion of the control information for each of the first carrier and the second carrier. In some cases, the prioritizing further includes determining that each of the first carrier and second carrier are to transmit portions of the control information during the TTI.

Control information prioritization component 940 may transmit the control information using the first carrier, transmit the control information and shared channel information using the first carrier, and transmit shared channel information scheduled to be transmitted on the second carrier. In some cases, the block acknowledgment control information is prioritized ahead of CSI control information or non-block acknowledgment control information. In some cases, the TTI includes a set of subframes, the second carrier is scheduled for transmissions in a first subframe and a second subframe that is after the first subframe, and the first carrier is scheduled for transmission in the second subframe, and where the allocating further includes prioritizing the second carrier to provide a first portion of the total transmission power to the second carrier irrespective of the scheduled transmission on of the first carrier.

Parameter determination component 945 may, in some cases, determine a modulation and coding scheme (MCS), a redundancy version identification (RV ID), a power loss (PL) measurement, or any combination thereof, associated with a transmission.

UL power allocation component 920 may transmit a first portion of the first subframe following the LBT procedure using the pre-allocated transmission powers, reallocate the total transmission power for the TTI across the first carrier and the second carrier based on the outcome of the LBT procedure, and transmit a remaining portion of the first subframe using the reallocated transmission powers.

Signaling component 955 may receive signaling from a base station indicating that the total transmission power for the TTI can be reallocated, signal the reallocation to the base station by puncturing a shared channel transmission during the first portion of the first subframe following the LBT procedure, and puncture the first carrier transmission during the LBT procedure. In some cases, the signaling is included in received downlink control information (DCI) from the base station or in radio resource control (RRC) signaling from the base station.

Figure 10:
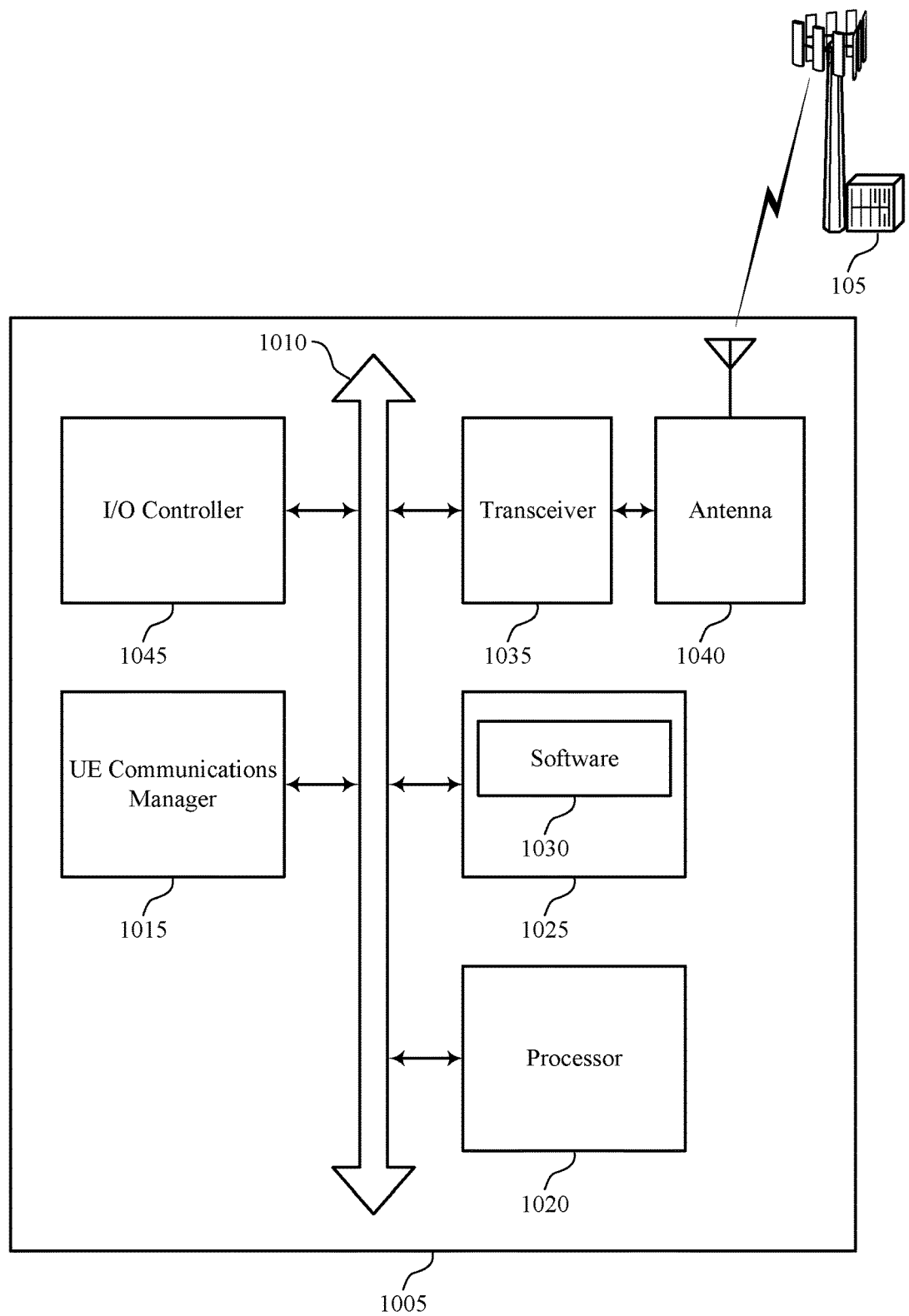
FIG. 10 illustrates a block diagram of a system including a UE that supports power allocation across multiple carriers using shared and dedicated radio frequency spectrum in accordance with aspects of the present disclosure.

FIG. 10 shows a diagram of a system 1000 including a device 1005 that supports power allocation across multiple carriers using shared and dedicated radio frequency spectrum in accordance with various aspects of the present disclosure. Device 1005 may be an example of or include the components of wireless device 705, wireless device 805, or a UE as described above, e.g., with reference to FIGS. 1, 2, 6, 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more busses (e.g., bus 1010). Device 1005 may communicate wirelessly with one or more base stations 105.

Processor 1020 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting power allocation across multiple carriers using shared and dedicated radio frequency spectrum).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support power allocation across multiple carriers using shared and dedicated radio frequency spectrum. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system.

Figure 11:
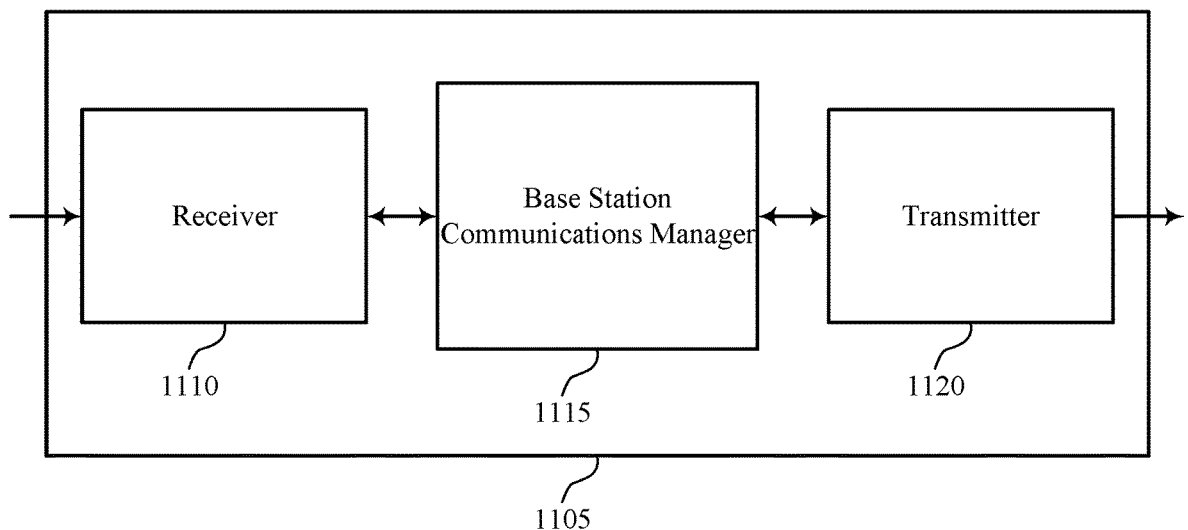
FIGS. 11 through 13 show block diagrams of a device that supports power allocation across multiple carriers using shared and dedicated radio frequency spectrum in accordance with aspects of the present disclosure.

FIG. 11 shows a block diagram 1100 of a wireless device 1105 that supports power allocation across multiple carriers using shared and dedicated radio frequency spectrum in accordance with various aspects of the present disclosure. Wireless device 1105 may be an example of aspects of a base station 105, 205, or 605 as described with reference to FIGS. 1, 2, and 6. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to power allocation across multiple carriers using shared and dedicated radio frequency spectrum, etc.). Information may be passed on to other components of the device. The receiver 1110 may be an example of aspects of the transceiver 1435 described with reference to FIG. 14.

Base station communications manager 1115 may be an example of aspects of the base station communications manager 1415 described with reference to FIG. 14. Base station communications manager 1115 may identify a UE capable of transmitting using both a first carrier and a second carrier, the first carrier using a dedicated radio frequency spectrum band and the second carrier using a shared radio frequency spectrum band, allocate wireless resources of the first carrier and the second carrier to the UE for uplink transmissions during a TTI, configure the UE to allocate a total transmission power for uplink transmissions during the TTI across the first carrier and the second carrier based on a type of control channel for transmission of control information during the TTI, a type of control information to be transmitted during the TTI, a timing for transmission of the control information, an outcome of the LBT procedure, a timing of the LBT procedure relative to the TTI, one or more other transmissions to be transmitted during the TTI, or any combination thereof, and receive the uplink transmissions from the UE on at least one of first carrier and the second carrier.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a single antenna, or it may include a set of antennas.

Figure 12:
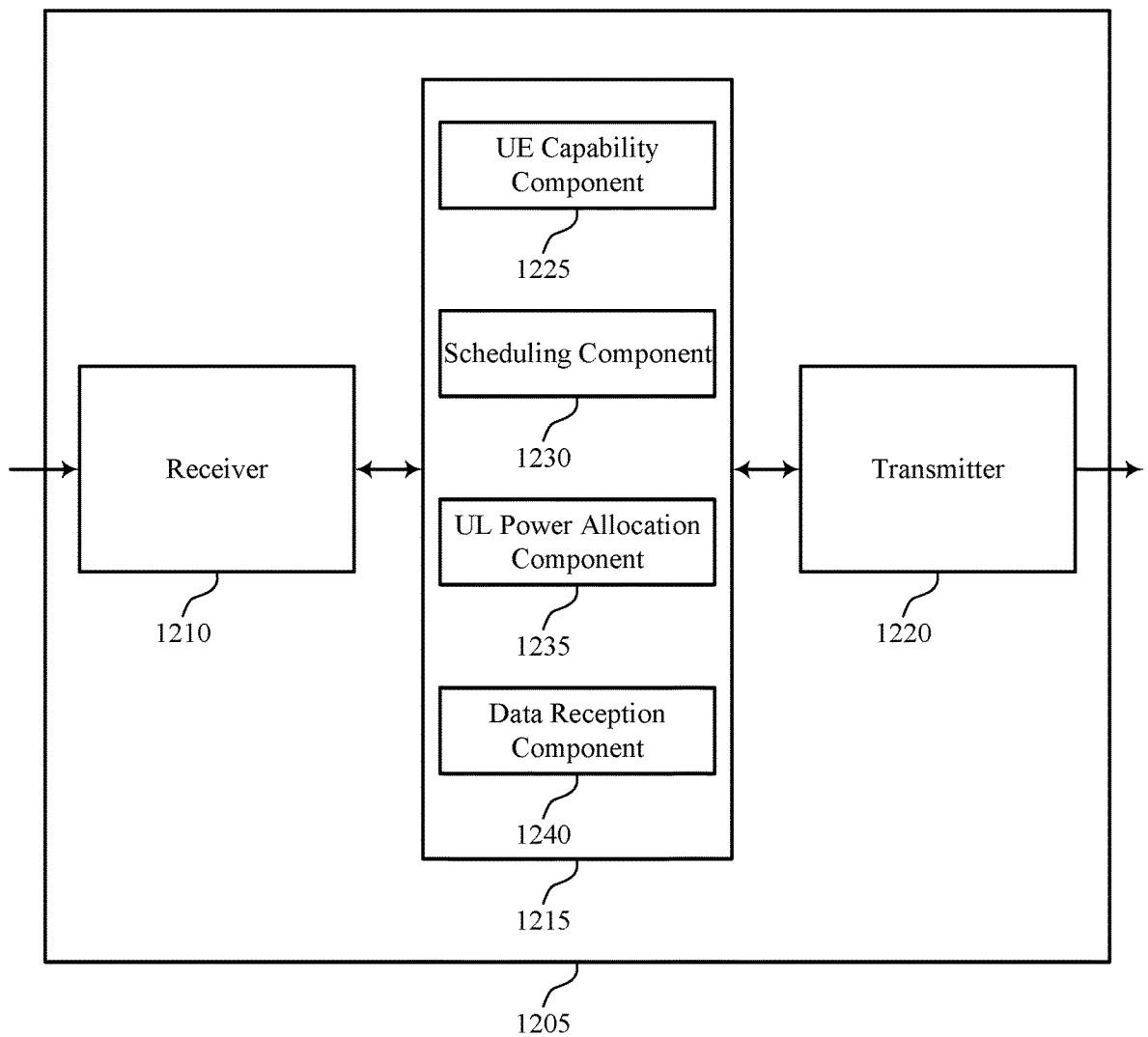

FIG. 12 shows a block diagram 1200 of a wireless device 1205 that supports power allocation across multiple carriers using shared and dedicated radio frequency spectrum in accordance with various aspects of the present disclosure. Wireless device 1205 may be an example of aspects of a wireless device 1105 or a base station as described with reference to FIGS. 1, 2, 6, and 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to power allocation across multiple carriers using shared and dedicated radio frequency spectrum, etc.). Information may be passed on to other components of the device. The receiver 1210 may be an example of aspects of the transceiver 1435 described with reference to FIG. 14.

Base station communications manager 1215 may be an example of aspects of the base station communications manager 1415 described with reference to FIG. 14. Base station communications manager 1215 may also include UE capability component 1225, scheduling component 1230, UL power allocation component 1235, and data reception component 1240.

UE capability component 1225 may identify a UE capable of transmitting using both a first carrier and a second carrier, the first carrier using a dedicated radio frequency spectrum band and the second carrier using a shared radio frequency spectrum band.

Scheduling component 1230 may allocate wireless resources of the first carrier and the second carrier to the UE for uplink transmissions during a TTI.

UL power allocation component 1235 may configure a UE to allocate a total transmission power for uplink transmissions during the TTI across the first carrier and the second carrier based on a type of control channel for transmission of control information during the TTI, a type of control information to be transmitted during the TTI, a timing for transmission of the control information, an outcome of the LBT procedure, a timing of the LBT procedure relative to the TTI, one or more other transmissions to be transmitted during the TTI, or any combination thereof.

Data reception component 1240 may receive the uplink transmissions from the UE on at least one of the first carrier and the second carrier.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas.

Figure 13:
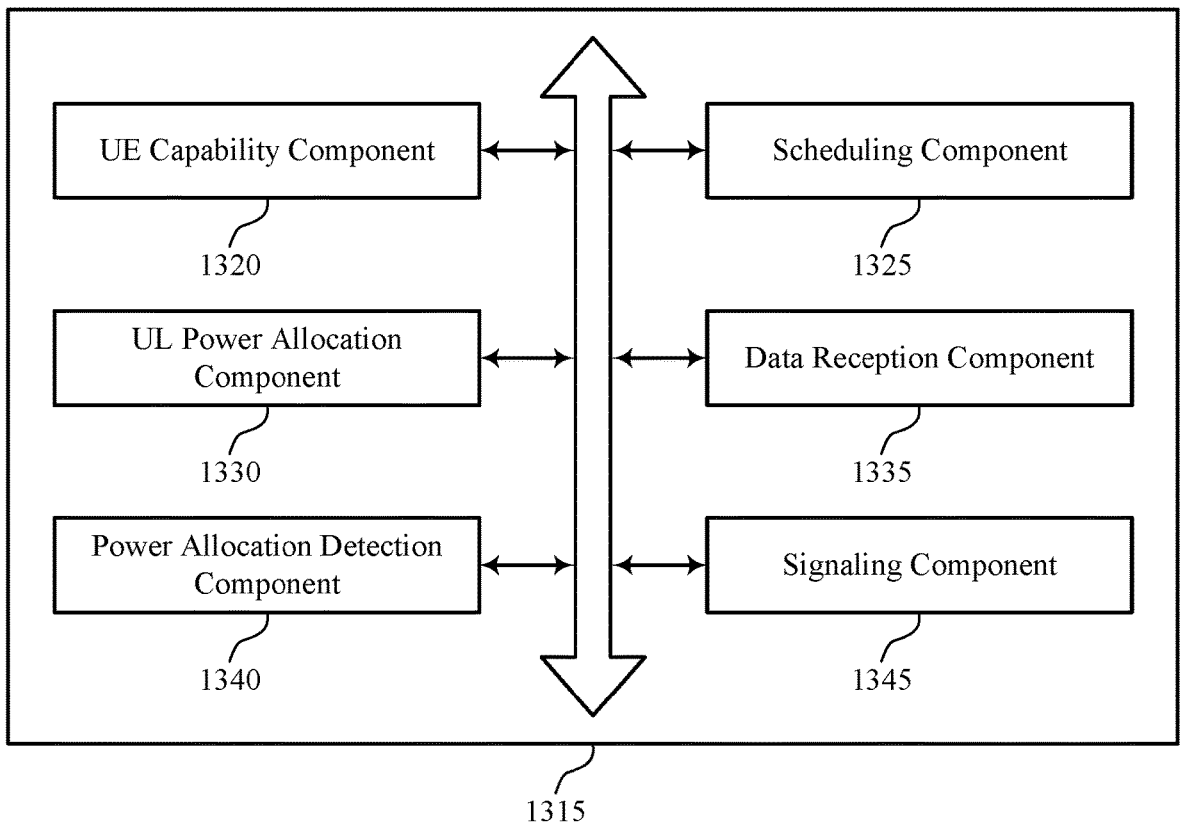

FIG. 13 shows a block diagram 1300 of a base station communications manager 1315 that supports power allocation across multiple carriers using shared and dedicated radio frequency spectrum in accordance with various aspects of the present disclosure. The base station communications manager 1315 may be an example of aspects of a base station communications manager 1415 described with reference to FIGS. 11, 12, and 14. The base station communications manager 1315 may include UE capability component 1320, scheduling component 1325, UL power allocation component 1330, data reception component 1335, power allocation detection component 1340, and signaling component 1345. Each of these modules may communicate, directly or indirectly, with one another (e.g., via one or more buses).

UE capability component 1320 may identify a UE capable of transmitting using both a first carrier and a second carrier, the first carrier using a dedicated radio frequency spectrum band and the second carrier using a shared radio frequency spectrum band.

Scheduling component 1325 may allocate wireless resources of the first carrier and the second carrier to the UE for uplink transmissions during a TTI.

UL power allocation component 1330 may configure the UE to allocate a total transmission power for uplink transmissions during the TTI across the first carrier and the second carrier based on a type of control channel for transmission of control information during the TTI, a type of control information to be transmitted during the TTI, a timing for transmission of the control information, an outcome of the LBT procedure, a timing of the LBT procedure relative to the TTI, one or more other transmissions to be transmitted during the TTI, or any combination thereof.

Data reception component 1335 may receive the uplink transmissions from the UE on at least one of the first carrier and the second carrier.

Power allocation detection component 1340 may detect the total transmission power allocation in the received uplink transmissions and determine the total transmission power allocation in the received uplink transmissions based on the punctured uplink transmission. In some cases, the detecting includes blindly estimating the total transmission power allocation in the received uplink transmissions. In some cases, the detecting includes determining that an uplink transmission on the first carrier has been punctured by the UE.

Signaling component 1345 may indicate in DCI or RRC signaling whether the allocation of total transmission power is enabled at the UE. In some cases, the configuring includes indicating in RRC signaling whether the allocation of total transmission power is enabled at the UE.

Figure 14:
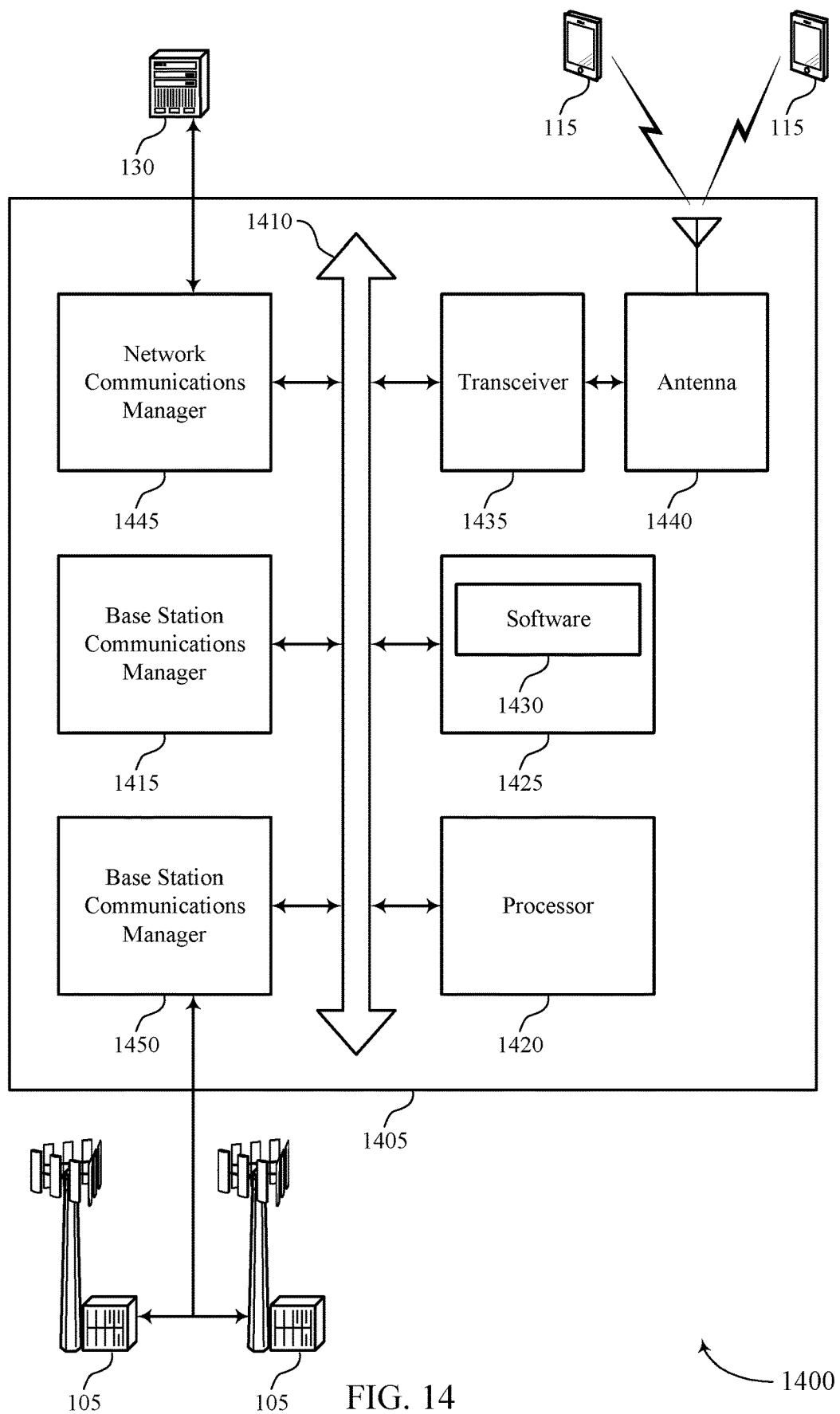
FIG. 14 illustrates a block diagram of a system including a base station that supports power allocation across multiple carriers using shared and dedicated radio frequency spectrum in accordance with aspects of the present disclosure.

FIG. 14 shows a diagram of a system 1400 including a device 1405 that supports power allocation across multiple carriers using shared and dedicated radio frequency spectrum in accordance with various aspects of the present disclosure. Device 1405 may be an example of or include the components of base station 105 as described above, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and base station communications manager 1450. These components may be in electronic communication via one or more busses (e.g., bus 1410). Device 1405 may communicate wirelessly with one or more UEs 115.

Base station communications manager 1415 may manage communications with other base stations 105, and may include a controller or scheduler for controlling communications with UEs 115 in cooperation with other base stations 105. For example, the base station communications manager 1415 may coordinate scheduling for transmissions to UEs 115 for various interference mitigation techniques such as beamforming or joint transmission. In some examples, base station communications manager 1415 may provide an X2 interface within an Long Term Evolution (LTE)/LTE-A wireless communication network technology to provide communication between base stations 105.

Processor 1420 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting power allocation across multiple carriers using shared and dedicated radio frequency spectrum).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support power allocation across multiple carriers using shared and dedicated radio frequency spectrum. Software 1430 may be stored in a non-transitory computer-readable medium such as system memory or other memory. In some cases, the software 1430 may not be directly executable by the processor but may cause a computer (e.g., when the code is compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Base station communications manager 1450 may manage communications with other base stations 105, and may include a controller or scheduler for controlling communications with UEs 115 in cooperation with other base stations 105. For example, the base station communications manager 1450 may coordinate scheduling for transmissions to UEs 115 for various interference mitigation techniques such as beamforming or joint transmission. In some examples, base station communications manager 1450 may provide an X2 interface within an LTE/LTE-A wireless communication network technology to provide communication between base stations 105.

Figure 15:
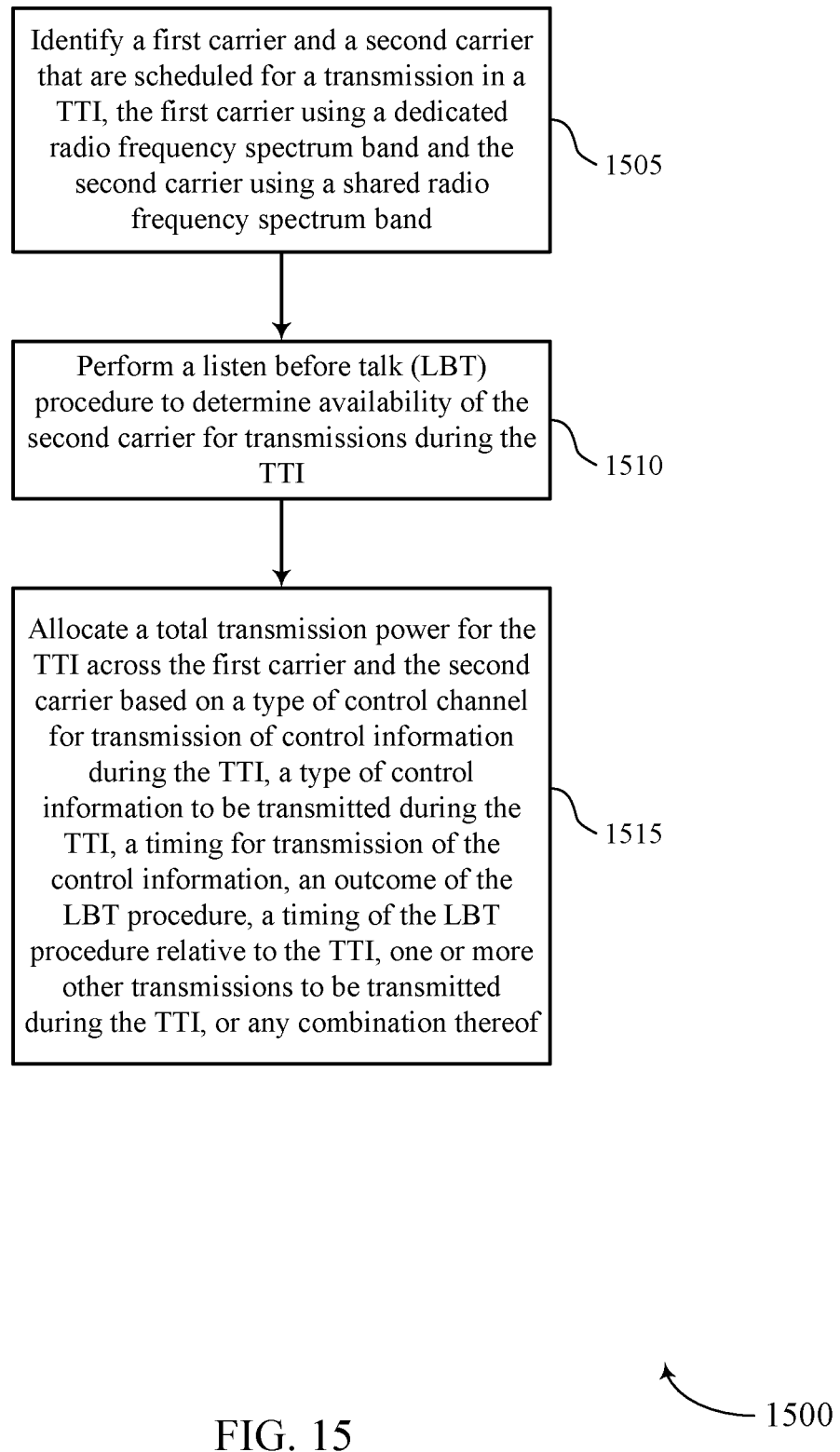
FIGS. 15 through 18 illustrate methods for power allocation across multiple carriers using shared and dedicated radio frequency spectrum in accordance with aspects of the present disclosure.

FIG. 15 shows a flowchart illustrating a method 1500 for power allocation across multiple carriers using shared and dedicated radio frequency spectrum in accordance with various aspects of the present disclosure. The operations of method 1500 may be implemented by a UE or its components as described herein. For example, the operations of method 1500 may be performed by a UE communications manager as described with reference to FIGS. 7 through 10. In some examples, a UE may execute a set of codes to control the functional elements of the device to perform the functions described below. Additionally or alternatively, the UE may perform aspects the functions described below using special-purpose hardware.

At block 1505 the UE may identify a first carrier and a second carrier that are scheduled for a transmission in a transmission time interval (TTI), the first carrier using a dedicated radio frequency spectrum band and the second carrier using a shared radio frequency spectrum band. The operations of block 1505 may be performed according to the methods described with reference to FIGS. 1 through 6. In certain examples, aspects of the operations of block 1505 may be performed by a scheduling component as described with reference to FIGS. 7 through 10.

At block 1510 the UE may perform a listen before talk (LBT) procedure to determine availability of the second carrier for transmissions during the TTI. The operations of block 1510 may be performed according to the methods described with reference to FIGS. 1 through 6. In certain examples, aspects of the operations of block 1510 may be performed by a LBT component as described with reference to FIGS. 7 through 10.

At block 1515 the UE may allocate a total transmission power for the TTI across the first carrier and the second carrier based at least in part on a type of control channel for transmission of control information during the TTI, a type of control information to be transmitted during the TTI, a timing for transmission of the control information, an outcome of the LBT procedure, a timing of the LBT procedure relative to the TTI, one or more other transmissions to be transmitted during the TTI, or any combination thereof. The operations of block 1515 may be performed according to the methods described with reference to FIGS. 1 through 6. In certain examples, aspects of the operations of block 1515 may be performed by a UL power allocation component as described with reference to FIGS. 7 through 10.

Figure 16:
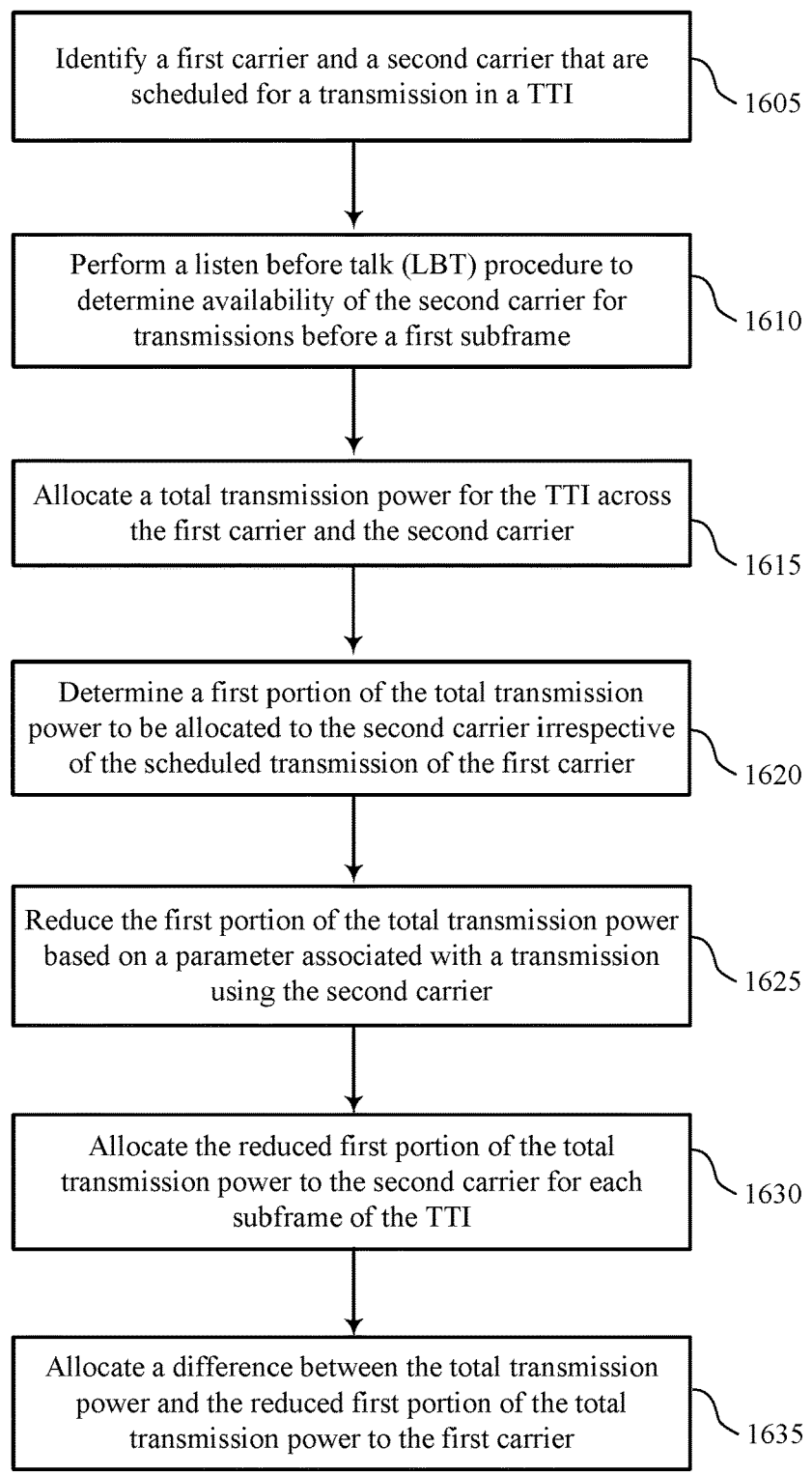

FIG. 16 shows a flowchart illustrating a method 1600 for power allocation across multiple carriers using shared and dedicated radio frequency spectrum in accordance with various aspects of the present disclosure. The operations of method 1600 may be implemented by a UE or its components as described herein. For example, the operations of method 1600 may be performed by a UE communications manager as described with reference to FIGS. 7 through 10. In some examples, a UE may execute a set of codes to control the functional elements of the device to perform the functions described below. Additionally or alternatively, the UE may perform aspects the functions described below using special-purpose hardware.

At block 1605 the UE may identify a first carrier and a second carrier that are scheduled for a transmission in a transmission time interval (TTI), the first carrier using a dedicated radio frequency spectrum band and the second carrier using a shared radio frequency spectrum band. The operations of block 1605 may be performed according to the methods described with reference to FIGS. 1 through 6. In certain examples, aspects of the operations of block 1605 may be performed by a scheduling component as described with reference to FIGS. 7 through 10.

At block 1610 the UE may perform a listen before talk (LBT) procedure to determine availability of the second carrier for transmissions during the TTI. The operations of block 1610 may be performed according to the methods described with reference to FIGS. 1 through 6. In certain examples, aspects of the operations of block 1610 may be performed by a LBT component as described with reference to FIGS. 7 through 10.

At block 1615 the UE may allocate a total transmission power for the TTI across the first carrier and the second carrier. Such an allocation may be based at least in part on a type of control channel for transmission of control information during the TTI, a type of control information to be transmitted during the TTI, a timing for transmission of the control information, an outcome of the LBT procedure, a timing of the LBT procedure relative to the TTI, one or more other transmissions to be transmitted during the TTI, or any combination thereof. The operations of block 1615 may be performed according to the methods described with reference to FIGS. 1 through 6. In certain examples, aspects of the operations of block 1615 may be performed by a UL power allocation component as described with reference to FIGS. 7 through 10.

At block 1620 the UE may determine a first portion of the total transmission power to be allocated to the second carrier irrespective of the scheduled transmission of the first carrier. The operations of block 1620 may be performed according to the methods described with reference to FIGS. 1 through 6. In certain examples, aspects of the operations of block 1620 may be performed by a UL power allocation component as described with reference to FIGS. 7 through 10.

At block 1625 the UE may reduce the first portion of the total transmission power based at least in part on a parameter associated with a transmission using the second carrier. The operations of block 1625 may be performed according to the methods described with reference to FIGS. 1 through 6. In certain examples, aspects of the operations of block 1625 may be performed by a UL power allocation component as described with reference to FIGS. 7 through 10.

At block 1630 the UE may allocate the reduced first portion of the total transmission power to the second carrier for each of the plurality of subframes. The operations of block 1630 may be performed according to the methods described with reference to FIGS. 1 through 6. In certain examples, aspects of the operations of block 1630 may be performed by a UL power allocation component as described with reference to FIGS. 7 through 10.

At block 1635 the UE may allocate a difference between the total transmission power and the reduced first portion of the total transmission power to the first carrier. The operations of block 1635 may be performed according to the methods described with reference to FIGS. 1 through 6. In certain examples, aspects of the operations of block 1635 may be performed by a UL power allocation component as described with reference to FIGS. 7 through 10.

Figure 17:
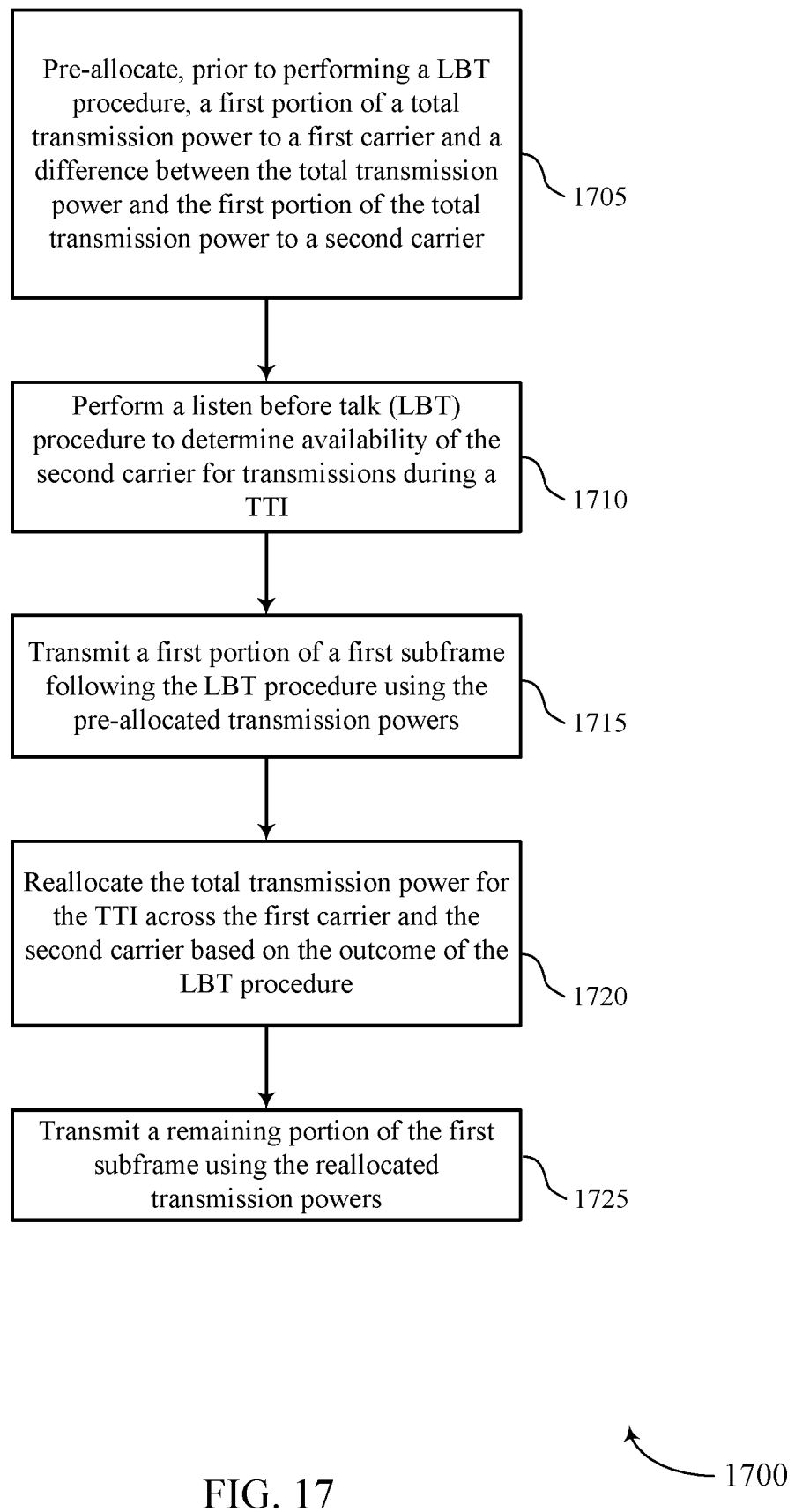

FIG. 17 shows a flowchart illustrating a method 1700 for power allocation across multiple carriers using shared and dedicated radio frequency spectrum in accordance with various aspects of the present disclosure. The operations of method 1700 may be implemented by a UE or its components as described herein. For example, the operations of method 1700 may be performed by a UE communications manager as described with reference to FIGS. 7 through 10. In some examples, a UE may execute a set of codes to control the functional elements of the device to perform the functions described below. Additionally or alternatively, the UE may perform aspects the functions described below using special-purpose hardware.

At block 1705 the UE may pre-allocate, prior to performing a LBT procedure, a first portion of a total transmission power to a first carrier and a difference between the total transmission power and the first portion of the total transmission power to a second carrier. The operations of block 1705 may be performed according to the methods described with reference to FIGS. 1 through 6. In certain examples, aspects of the operations of block 1705 may be performed by a UL power allocation component as described with reference to FIGS. 7 through 10.

At block 1710 the UE may perform a listen before talk (LBT) procedure to determine availability of the second carrier for transmissions during the TTI. The operations of block 1710 may be performed according to the methods described with reference to FIGS. 1 through 6. In certain examples, aspects of the operations of block 1710 may be performed by a LBT component as described with reference to FIGS. 7 through 10.

At block 1715 the UE may transmit a first portion of the first subframe following the LBT procedure using the pre-allocated transmission powers. The operations of block 1715 may be performed according to the methods described with reference to FIGS. 1 through 6. In certain examples, aspects of the operations of block 1715 may be performed by a UL power allocation component as described with reference to FIGS. 7 through 10.

At block 1720 the UE may reallocate the total transmission power for the TTI across the first carrier and the second carrier based at least in part on the outcome of the LBT procedure. The operations of block 1720 may be performed according to the methods described with reference to FIGS. 1 through 6. In certain examples, aspects of the operations of block 1720 may be performed by a UL power allocation component as described with reference to FIGS. 7 through 10.

At block 1725 the UE may transmit a remaining portion of the first subframe using the reallocated transmission powers. The operations of block 1725 may be performed according to the methods described with reference to FIGS. 1 through 6. In certain examples, aspects of the operations of block 1725 may be performed by a UL power allocation component as described with reference to FIGS. 7 through 10.

Figure 18:
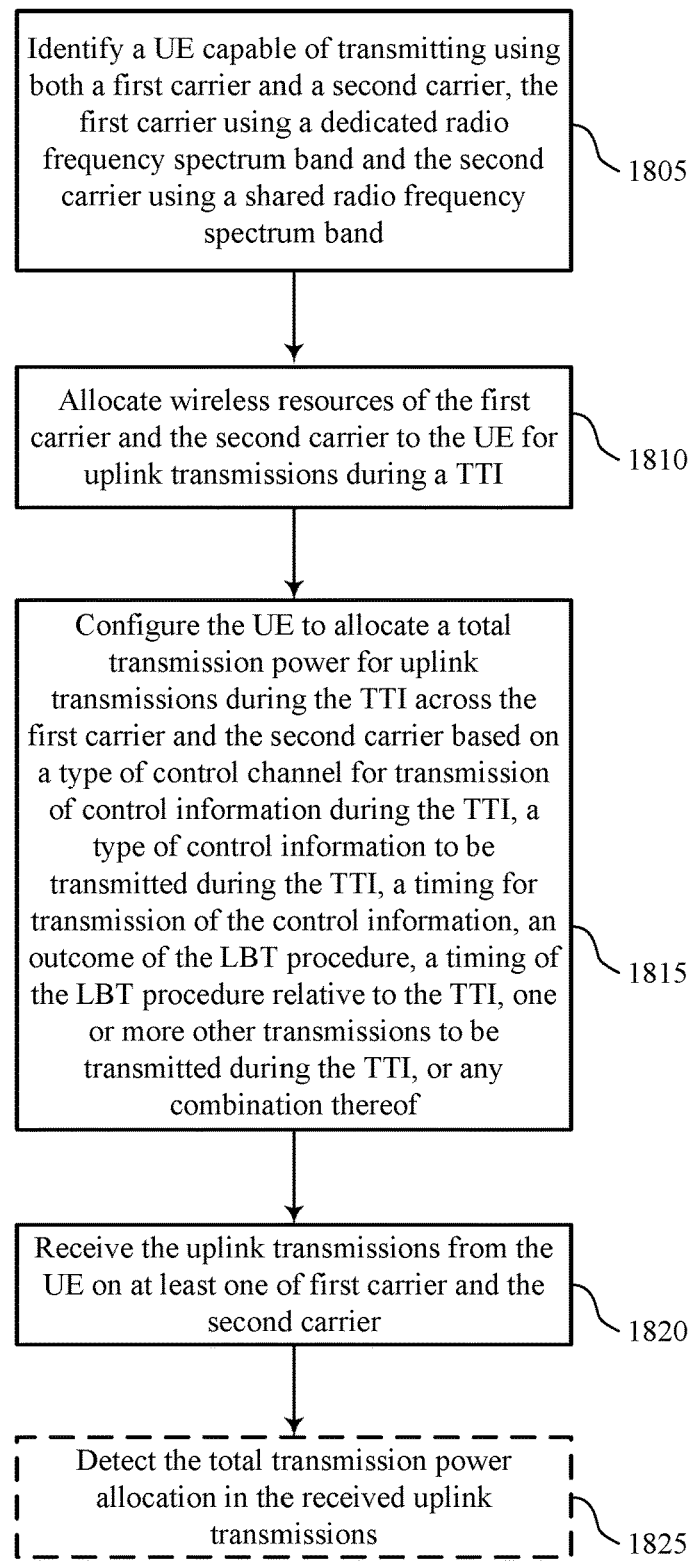

FIG. 18 shows a flowchart illustrating a method 1800 for power allocation across multiple carriers using shared and dedicated radio frequency spectrum in accordance with various aspects of the present disclosure. The operations of method 1800 may be implemented by a base station or its components as described herein. For example, the operations of method 1800 may be performed by a base station communications manager as described with reference to FIGS. 11 through 14. In some examples, a base station may execute a set of codes to control the functional elements of the device to perform the functions described below. Additionally or alternatively, the base station may perform aspects the functions described below using special-purpose hardware.

At block 1805 the base station may identify a user equipment (UE) capable of transmitting using both a first carrier and a second carrier, the first carrier using a dedicated radio frequency spectrum band and the second carrier using a shared radio frequency spectrum band. The operations of block 1805 may be performed according to the methods described with reference to FIGS. 1 through 6. In certain examples, aspects of the operations of block 1805 may be performed by a UE capability component as described with reference to FIGS. 11 through 14.

At block 1810 the base station may allocate wireless resources of the first carrier and the second carrier to the UE for uplink transmissions during a transmission time interval (TTI). The operations of block 1810 may be performed according to the methods described with reference to FIGS. 1 through 6. In certain examples, aspects of the operations of block 1810 may be performed by a scheduling component as described with reference to FIGS. 11 through 14.

At block 1815 the base station may configure the UE to allocate a total transmission power for uplink transmissions during the TTI across the first carrier and the second carrier based at least in part on a type of control channel for transmission of control information during the TTI, a type of control information to be transmitted during the TTI, a timing for transmission of the control information, an outcome of the LBT procedure, a timing of the LBT procedure relative to the TTI, one or more other transmissions to be transmitted during the TTI, or any combination thereof. The operations of block 1815 may be performed according to the methods described with reference to FIGS. 1 through 6. In certain examples, aspects of the operations of block 1815 may be performed by a UL power allocation component as described with reference to FIGS. 11 through 14.

At block 1820 the base station may receive the uplink transmissions from the UE on at least one of first carrier and the second carrier. The operations of block 1820 may be performed according to the methods described with reference to FIGS. 1 through 6. In certain examples, aspects of the operations of block 1820 may be performed by a data reception component as described with reference to FIGS. 11 through 14.

At optional block 1825 the base station may detect the total transmission power allocation in the received uplink transmissions. The operations of block 1825 may be performed according to the methods described with reference to FIGS. 1 through 6. In certain examples, aspects of the operations of block 1825 may be performed by a power allocation detection component as described with reference to FIGS. 11 through 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), a Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a first carrier and a second carrier that are scheduled for a transmission in a transmission time interval (TTI), wherein the TTI includes a plurality of subframes, the first carrier using a dedicated radio frequency spectrum band and the second carrier using a shared radio frequency spectrum band, and the second carrier is scheduled for transmissions in a first subframe and a second subframe that is after the first subframe, and the first carrier is scheduled for transmission in the second subframe;
   performing a listen before talk (LBT) procedure to determine availability of the second carrier for transmissions during the TTI;
   prioritizing at least one of the first carrier or the second carrier for power allocation based at least in part on a payload of control information, wherein the second carrier is prioritized to provide a first portion of a total transmission power to the second carrier irrespective of the scheduled transmission on the first carrier; and
   allocating the total transmission power for the TTI across the first carrier and the second carrier based at least in part on the prioritizing and a type of control channel for transmission of the payload of control information during the TTI, an outcome of the LBT procedure, a timing of the LBT procedure relative to the TTI, one or more other transmissions to be transmitted during the TTI, or any combination thereof, wherein a difference between the total transmission power and the first portion of the total transmission power is allocated to the first carrier.

2. The method of claim 1, wherein the second carrier is scheduled for transmissions in each of the plurality of subframes, and wherein the allocating further comprises:
   determining the first portion of the total transmission power to be allocated to the second carrier irrespective of the scheduled transmission of the first carrier;
   reducing the first portion of the total transmission power based at least in part on a parameter associated with a transmission using the second carrier;
   allocating the reduced first portion of the total transmission power to the second carrier for each of the plurality of subframes; and
   allocating a difference between the total transmission power and the reduced first portion of the total transmission power to the first carrier.

3. The method of claim 2, wherein the parameter associated with the transmission using the second carrier comprises a modulation and coding scheme (MCS), a redundancy version identification (RV ID), a power loss (PL) measurement, or any combination thereof.

4. The method of claim 1, wherein the allocating further comprises:
   determining whether the second carrier is scheduled for transmission in a third subframe of the plurality of subframes after the second subframe;
   dropping the first carrier in the second subframe; and
   allocating the total transmission power to the second carrier.

5. The method of claim 1, wherein the allocating further comprises:
   determining that control information and shared channel information is scheduled to be transmitted on the first carrier during the second subframe;
   diverting a portion of the total transmission power to the first carrier;

transmitting the control information using the first carrier; and dropping the shared channel information scheduled to be transmitted on the first carrier.

6. The method of claim 1, wherein the allocating further comprises:

determining that control information and shared channel information is scheduled to be transmitted on the first carrier during the second subframe and that only the shared channel information is scheduled to be transmitted on the second carrier during the second subframe;

diverting a first portion of the total transmission power to the first carrier;

transmitting the control information and the shared channel information using the first carrier; and transmitting the shared channel information scheduled to be transmitted on the second carrier.

7. The method of claim 6, wherein a ratio of the total transmission power to divert is based at least in part on whether channel state information (CSI) is to be transmitted using the second carrier.

8. The method of claim 1, wherein each of the first carrier and the second carrier are scheduled for transmissions in a first subframe immediately following completion of the LBT procedure, and wherein the allocating further comprises:

pre-allocating, prior to performing the LBT procedure, the first portion of the total transmission power to the first carrier and the difference between the total transmission power and the first portion of the total transmission power to the second carrier.

9. The method of claim 8, wherein a ratio between the first portion and the total transmission power is determined based at least in part on whether control channel information scheduled on one or more of the first carrier or the second carrier, or whether channel state information (CSI) is to be transmitted using a physical uplink shared channel (PUSCH).

10. The method of claim 8, further comprising:

transmitting a first portion of a first subframe following the LBT procedure using the pre-allocated transmission powers;

reallocating the total transmission power for the TTI across the first carrier and the second carrier based at least in part on the outcome of the LBT procedure; and transmitting a remaining portion of the first subframe using the reallocated transmission powers.

11. The method of claim 1, wherein each of the first carrier and the second carrier are scheduled for transmissions in the first subframe and the LBT procedure is completed during the first subframe, and wherein the allocating further comprises:

pre-allocating, prior to performing the LBT procedure, the first portion of the total transmission power to the first carrier and the difference between the total transmission power and the first portion of the total transmission power to the second carrier; and transmitting on the first carrier during an entirety of the first subframe using the first portion of the total transmission power regardless of the outcome of the LBT procedure.

12. The method of claim 1, wherein allocating the total transmission power for the TTI across the first carrier and the second carrier is further based on whether the first carrier is associated with a primary cell or a primary secondary cell.

13. A method for wireless communication, comprising:

identifying a user equipment (UE) capable of transmitting using both a first carrier and a second carrier, the first carrier using a dedicated radio frequency spectrum band and the second carrier using a shared radio frequency spectrum band;

allocating wireless resources of the first carrier and the second carrier to the UE for uplink transmissions during a transmission time interval (TTI), wherein the TTI includes a plurality of subframes, and the second carrier is scheduled for transmissions in a first subframe and a second subframe that is after the first subframe, and the first carrier is scheduled for transmission in the second subframe;

configuring the UE to prioritize at least one of the first carrier or the second carrier for power allocation based at least in part on a payload of control information, wherein the second carrier is prioritized to provide a first portion of a total transmission power to the second carrier irrespective of the scheduled transmission on the first carrier;

configuring the UE to allocate the total transmission power for the uplink transmissions during the TTI across the first carrier and the second carrier based at least in part on the prioritizing and a type of control channel for transmission of the payload of the control information during the TTI, an outcome of a listen before talk (LBT) procedure, a timing of the LBT procedure relative to the TTI, one or more other transmissions to be transmitted during the TTI, or any combination thereof, wherein a difference between the total transmission power and the first portion of the total transmission power is allocated to the first carrier; and receiving the uplink transmissions from the UE on at least one of first carrier or the second carrier.

14. An apparatus for wireless communication, comprising:

means for identifying a first carrier and a second carrier that are scheduled for a transmission in a transmission time interval (TTI), wherein the TTI includes a plurality of subframes, the first carrier using a dedicated radio frequency spectrum band and the second carrier using a shared radio frequency spectrum band, and the second carrier is scheduled for transmissions in a first subframe and a second subframe that is after the first subframe, and the first carrier is scheduled for transmission in the second subframe;

means for performing a listen before talk (LBT) procedure to determine availability of the second carrier for transmissions during the TTI;

means for prioritizing at least one of the first carrier or the second carrier for power allocation based at least in part on a payload of control information, wherein the second carrier is prioritized to provide a first portion of a total transmission power to the second carrier irrespective of the scheduled transmission on the first carrier; and means for allocating the total transmission power for the TTI across the first carrier and the second carrier based at least in part on the prioritizing and a type of control channel for transmission of the payload of control information during the TTI, an outcome of the LBT procedure, a timing of the LBT procedure relative to the TTI, one or more other transmissions to be transmitted during the TTI, or any combination thereof, wherein a difference between the total transmission power and the first portion of the total transmission power is allocated to the first carrier.

15. The apparatus of claim 14, wherein
the means for allocating the total transmission power for the TTI across the first carrier and the second carrier comprises:
means for determining whether the second carrier is scheduled for transmission in a third subframe of the plurality of subframes after the second subframe;
means for dropping the first carrier in the second subframe; and
means for allocating the total transmission power to the second carrier.

16. The apparatus of claim 14, wherein
each of the first carrier and the second carrier are scheduled for transmissions in a first subframe immediately following completion of the LBT procedure, and
wherein the means for allocating the total transmission power for the TTI across the first carrier and the second carrier comprises means for pre-allocating, prior to performing the LBT procedure, the first portion of the total transmission power to the first carrier and the difference between the total transmission power and the first portion of the total transmission power to the second carrier.

17. The apparatus of claim 14, wherein allocating the total transmission power for the TTI across the first carrier and the second carrier is further based on whether the first carrier is associated with a primary cell or a primary secondary cell.

18. An apparatus for wireless communication, comprising:
means for identifying a user equipment (UE) capable of transmitting using both a first carrier and a second carrier, the first carrier using a dedicated radio frequency spectrum band and the second carrier using a shared radio frequency spectrum band;
means for allocating wireless resources of the first carrier and the second carrier to the UE for uplink transmissions during a transmission time interval (TTI), wherein the TTI includes a plurality of subframes, and the second carrier is scheduled for transmissions in a first subframe and a second subframe that is after the first subframe, and the first carrier is scheduled for transmission in the second subframe;
means for configuring the UE to prioritize at least one of the first carrier or the second carrier for power allocation based at least in part on a payload of control information, wherein the second carrier is prioritized to provide a first portion of a total transmission power to the second carrier irrespective of the scheduled transmission on the first carrier;
means for configuring the UE to allocate the total transmission power for the uplink transmissions during the TTI across the first carrier and the second carrier based at least in part on the prioritizing and a type of control channel for transmission of the payload of the control information during the TTI, an outcome of a listen before talk (LBT) procedure, a timing of the LBT procedure relative to the TTI, one or more other transmissions to be transmitted during the TTI, or any combination thereof, wherein a difference between the total transmission power and the first portion of the total transmission power is allocated to the first carrier;
means for and
means for receiving the uplink transmissions from the UE on at least one of first carrier or the second carrier.

19. An apparatus for wireless communication, in a system comprising:
a processor;
memory in electronic communication with the processor; and
instructions stored in the memory and operable, when executed by the processor, to cause the apparatus to:
identify a first carrier and a second carrier that are scheduled for a transmission in a transmission time interval (TTI), wherein the TTI includes a plurality of subframes, the first carrier using a dedicated radio frequency spectrum band and the second carrier using a shared radio frequency spectrum band, and the second carrier is scheduled for transmissions in a first subframe and a second subframe that is after the first subframe, and the first carrier is scheduled for transmission in the second subframe;
perform a listen before talk (LBT) procedure to determine availability of the second carrier for transmissions during the TTI;
prioritize at least one of the first carrier or the second carrier for power allocation based at least in part on a payload of control information, wherein the second carrier is prioritized to provide a first portion of a total transmission power to the second carrier irrespective of the scheduled transmission on the first carrier; and
allocate the total transmission power for the TTI across the first carrier and the second carrier based at least in part on the prioritizing and a type of control channel for transmission of the payload of control information during the TTI, an outcome of the LBT procedure, a timing of the LBT procedure relative to the TTI, one or more other transmissions to be transmitted during the TTI, or any combination thereof, wherein a difference between the total transmission power and the first portion of the total transmission power is allocated to the first carrier.

20. The apparatus of claim 19, wherein
the instructions executable by the processor to allocate a total transmission power for the TTI across the first carrier and the second carrier comprise instructions executable by the processor to:
determine the first portion of the total transmission power to be allocated to the second carrier irrespective of the scheduled transmission of the first carrier;
reduce the first portion of the total transmission power based at least in part on a parameter associated with a transmission using the second carrier;
allocate the reduced first portion of the total transmission power to the second carrier for each of the plurality of subframes; and
allocate a difference between the total transmission power and the reduced first portion of the total transmission power to the first carrier.

21. The apparatus of claim 20, wherein the parameter associated with the transmission using the second carrier comprises a modulation and coding scheme (MCS), a redundancy version identification (RV ID), a power loss (PL) measurement, or any combination thereof.

22. The apparatus of claim 19, wherein
the instructions executable by the processor to allocate the total transmission power for the TTI across the first carrier and the second carrier comprise instructions executable by the processor to:

determine whether the second carrier is scheduled for transmission in a third subframe of the plurality of subframes after the second subframe;
drop the first carrier in the second subframe; and
allocate the total transmission power to the second carrier.

23. The apparatus of claim 19,
wherein the instructions executable by the processor to allocate a total transmission power for the TTI across the first carrier and the second carrier comprise instructions executable by the processor to:
determine that control information and shared channel information is scheduled to be transmitted on the first carrier during the second subframe;
divert a portion of the total transmission power to the first carrier;
transmit the control information using the first carrier; and
drop the shared channel information scheduled to be transmitted on the first carrier.

24. The apparatus of claim 19,
wherein the instructions executable by the processor to allocate the total transmission power for the TTI across the first carrier and the second carrier comprise instructions executable by the processor to:
determine that control information and shared channel information is scheduled to be transmitted on the first carrier during the second subframe and that only the shared channel information is scheduled to be transmitted on the second carrier during the second subframe;
divert a first portion of the total transmission power to the first carrier;
transmit the control information and the shared channel information using the first carrier; and
transmit the shared channel information scheduled to be transmitted on the second carrier.

25. The apparatus of claim 24, wherein a ratio of the total transmission power to divert is based at least in part on whether channel state information (CSI) is to be transmitted using the second carrier.

26. The apparatus of claim 19, wherein
each of the first carrier and the second carrier are scheduled for transmission in a first subframe immediately following completion of the LBT procedure, and
wherein the instructions further comprise instructions executable by the processor to pre-allocate, prior to performing the LBT procedure, the first portion of the total transmission power to the first carrier and the difference between the total transmission power and the first portion of the total transmission power to the second carrier.

27. The apparatus of claim 26, wherein a ratio between the first portion and the total transmission power is determined based at least in part on whether control channel information is scheduled for transmission on one or more of the first carrier or the second carrier, or whether channel state information (CSI) is to be transmitted using a physical uplink shared channel (PUSCH).

28. The apparatus of claim 26, wherein the instructions comprise instructions executable by the processor to:
transmit a first portion of a first subframe following the LBT procedure using the pre-allocated transmission powers;
reallocate the total transmission power for the TTI across the first carrier and the second carrier based at least in part on the outcome of the LBT procedure; and
transmit a remaining portion of the first subframe using the reallocated transmission powers.

29. The apparatus of claim 19, wherein
each of the first carrier and the second carrier are scheduled for transmissions in the first subframe and the LBT procedure is completed during the first subframe, and
wherein the instructions are operable, when executed by the processor, to cause the apparatus to:
pre-allocate, prior to performing the LBT procedure, the first portion of the total transmission power to the first carrier and the difference between the total transmission power and the first portion of the total transmission power to the second carrier; and
transmitting on the first carrier during an entirety of the first subframe using the first portion of the total transmission power regardless of the outcome of the LBT procedure.

30. The apparatus of claim 19, wherein allocating the total transmission power for the TTI across the first carrier and the second carrier is further based on whether the first carrier is associated with a primary cell or a primary secondary cell.

31. An apparatus for wireless communication, in a system comprising:
a processor;
memory in electronic communication with the processor; and
instructions stored in the memory and operable, when executed by the processor, to cause the apparatus to:
identify a user equipment (UE) capable of transmitting using both a first carrier and a second carrier, the first carrier using a dedicated radio frequency spectrum band and the second carrier using a shared radio frequency spectrum band;
allocate wireless resources of the first carrier and the second carrier to the UE for uplink transmissions during a transmission time interval (TTI), wherein the TTI includes a plurality of subframes, and the second carrier is scheduled for transmissions in a first subframe and a second subframe that is after the first subframe, and the first carrier is scheduled for transmission in the second subframe;
configure the UE to prioritize at least one of the first carrier or the second carrier for power allocation based at least in part on a payload of control information, wherein the second carrier is prioritized to provide a first portion of a total transmission power to the second carrier irrespective of the scheduled transmission on the first carrier;
configure the UE to allocate the total transmission power for the uplink transmissions during the TTI across the first carrier and the second carrier based at least in part on the prioritizing and a type of control channel for transmission of the payload of the control information during the TTI, an outcome of a listen before talk (LBT) procedure, a timing of the LBT procedure relative to the TTI, one or more other transmissions to be transmitted during the TTI, or any combination thereof, wherein a difference between the total transmission power and the first portion of the total transmission power is allocated to the first carrier; and
receive the uplink transmissions from the UE on at least one of first carrier or the second carrier.

32. A non-transitory computer readable medium storing code for wireless communication, the code comprising instructions executable by a processor to:

identify a first carrier and a second carrier that are scheduled for a transmission in a transmission time interval (TTI), wherein the TTI includes a plurality of subframes, the first carrier using a dedicated radio frequency spectrum band and the second carrier using a shared radio frequency spectrum band, and the second carrier is scheduled for transmissions in a first subframe and a second subframe that is after the first subframe, and the first carrier is scheduled for transmission in the second subframe;

perform a listen before talk (LBT) procedure to determine availability of the second carrier for transmissions during the TTI;

prioritize at least one of the first carrier or the second carrier for power allocation based at least in part on a payload of control information, wherein the second carrier is prioritized to provide a first portion of a total transmission power to the second carrier irrespective of the scheduled transmission on the first carrier; and allocate the total transmission power for the TTI across the first carrier and the second carrier based at least in part on the prioritizing and a type of control channel for transmission of the payload of control information during the TTI, an outcome of the LBT procedure, a timing of the LBT procedure relative to the TTI, one or more other transmissions to be transmitted during the TTI, or any combination thereof, wherein a difference between the total transmission power and the first portion of the total transmission power is allocated to the first carrier.

33. The non-transitory computer readable medium of claim 32, wherein the code further comprises instructions executable by the processor to:

determine whether the second carrier is scheduled for transmission in a third subframe of the plurality of subframes after the second subframe;

drop the first carrier in the second subframe; and allocate the total transmission power to the second carrier.

34. The non-transitory computer readable medium of claim 32, wherein each of the first carrier and the second carrier are scheduled for transmissions in a first subframe immediately following completion of the LBT procedure, and wherein the code further comprises instructions executable by the processor to;

pre-allocate, prior to performing the LBT procedure, the first portion of the total transmission power to the first carrier and the difference between the total transmission power and the first portion of the total transmission power to the second carrier.

35. The non-transitory computer readable medium of claim 32, wherein allocating the total transmission power for the TTI across the first carrier and the second carrier is further based on whether the first carrier is associated with a primary cell or a primary secondary cell.

36. A non-transitory computer readable medium storing code for wireless communication, the code comprising instructions executable by the processor to:

identify a user equipment (UE) capable of transmitting using both a first carrier and a second carrier, the first carrier using a dedicated radio frequency spectrum band and the second carrier using a shared radio frequency spectrum band;

allocate wireless resources of the first carrier and the second carrier to the UE for uplink transmissions during a transmission time interval (TTI), wherein the TTI includes a plurality of subframes, and the second carrier is scheduled for transmissions in a first subframe and a second subframe that is after the first subframe, and the first carrier is scheduled for transmission in the second subframe;

configure the UE to prioritize at least one of the first carrier or the second carrier for power allocation based at least in part on a payload of control information, wherein the second carrier is prioritized to provide a first portion of a total transmission power to the second carrier irrespective of the scheduled transmission on the first carrier;

configure the UE to allocate the total transmission power for the uplink transmissions during the TTI across the first carrier and the second carrier based at least in part on the prioritizing and a type of control channel for transmission of the payload of the control information during the TTI, an outcome of a listen before talk (LBT) procedure, a timing of the LBT procedure relative to the TTI, one or more other transmissions to be transmitted during the TTI, or any combination thereof, wherein a difference between the total transmission power and the first portion of the total transmission power is allocated to the first carrier; and receive the uplink transmissions from the UE on at least one of first carrier or the second carrier.

* * * * *